US009848242B2

(12) United States Patent
McCarty et al.

(10) Patent No.: US 9,848,242 B2
(45) Date of Patent: Dec. 19, 2017

(54) SYSTEMS AND METHODS FOR ADJUSTING THE PRIORITY OF MEDIA ASSETS SCHEDULED TO BE RECORDED

(71) Applicant: Rovi Guides, Inc., Santa Clara, CA (US)

(72) Inventors: Michael K. McCarty, Agoura Hills, CA (US); Glen E. Roe, Simi Valley, CA (US)

(73) Assignee: Rovi Guides, Inc., San Carlos, CA (US)

(*) Notice: Subject to any disclaimer, the term of this patent is extended or adjusted under 35 U.S.C. 154(b) by 55 days.

(21) Appl. No.: 14/870,387

(22) Filed: Sep. 30, 2015

(65) Prior Publication Data

US 2017/0094355 A1   Mar. 30, 2017

(51) Int. Cl.
*H04N 5/76* (2006.01)
*H04N 21/466* (2011.01)
*G06F 17/30* (2006.01)
*H04N 21/442* (2011.01)
*H04N 21/433* (2011.01)
*H04N 21/4335* (2011.01)
*H04N 21/475* (2011.01)
*H04N 21/45* (2011.01)

(52) U.S. Cl.
CPC ..... *H04N 21/4667* (2013.01); *G06F 17/3053* (2013.01); *G06F 17/3082* (2013.01); *G06F 17/30828* (2013.01); *H04N 21/4334* (2013.01); *H04N 21/4335* (2013.01); *H04N 21/44222* (2013.01); *H04N 21/4532* (2013.01); *H04N 21/4755* (2013.01)

(58) Field of Classification Search
CPC .......... H04N 21/4667; H04N 21/4334; H04N 21/4335; H04N 21/44222; H04N 21/4532; H04N 21/4755; H04N 21/4821; H04N 21/4828; G06F 17/3053; G06F 17/3082; G06F 17/30828
USPC ........................................................ 386/294
See application file for complete search history.

(56) References Cited

U.S. PATENT DOCUMENTS

| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,756,997 | B1 | 6/2004 | Ward et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,457,475 | B2 | 6/2013 | Ellis et al. |
| 8,732,764 | B2 | 5/2014 | Kummer et al. |
| 8,798,444 | B1 | 8/2014 | Crandall |

(Continued)

*Primary Examiner* — William Tran
(74) *Attorney, Agent, or Firm* — Haley Guiliano LLP

(57) ABSTRACT

Systems and methods are described herein for adjusting the priority of media assets scheduled to be recorded to reflect the current behavior and interests of the user. For example, a household with young children may have scheduled recordings for the DVR with a wide variety of television shows of different genres (e.g., Children's Shows, Sports Games, and Crime Procedurals) and as the children grow up, the preference may gradually shift towards other types of shows. As this shift of interest happens over time, it can be difficult or impossible for the user to change the priority of each of the media assets of the scheduled recordings each time the interests of the user changes an incremental amount.

20 Claims, 9 Drawing Sheets

(56) References Cited

U.S. PATENT DOCUMENTS

| | | |
|---|---|---|
| 2002/0174430 A1 | 11/2002 | Ellis et al. |
| 2003/0110499 A1 | 6/2003 | Knudson et al. |
| 2004/0123319 A1* | 6/2004 | Kim .................. H04N 5/44543 |
| | | 725/53 |
| 2005/0251827 A1 | 11/2005 | Ellis et al. |
| 2010/0153885 A1 | 6/2010 | Yates |
| 2011/0185388 A1 | 7/2011 | Gratton |
| 2014/0126890 A1* | 5/2014 | Engeli ................ H04N 21/4147 |
| | | 386/296 |
| 2015/0339059 A1* | 11/2015 | Kang ................... G06F 12/023 |
| | | 711/154 |

\* cited by examiner

600

600 ...
601 Initialization Subroutine
602 ...
603 //Routine to determine a correlation strength based on the media assets scheduled to be recorded and the user profile:
604
605 Receive instances of media assets scheduled to be recorded
606 For each instance of media assets scheduled to be recorded:
607   A = Accessed value of current recording priority of the instance of the next media asset
608   B = Accessed value of expected recording priority based on expected preference level of the instance of the media assets scheduled to be recorded
609     If (Abs(A-B)<=tolerance)
610       Execute Subroutine to generate a correlation strength indicating that the current priority does not need to be adjusted using control circuitry
611     Else If (A<B)
612       Execute Subroutine to generate a correlation strength indicating that the current recording priority needs increasing using control circuitry
613     Else
614       Execute Subroutine to generate a correlation strength indicating that the current recording priority needs decreasing using control circuitry
615   Execute Subroutine to adjust the recording priorities of the media assets scheduled to be recorded based on the correlation strength using control circuitry
616 ...
617 Termination Subroutine
618 ...

800 ...
801 Initialization Subroutine
802 ...
803 //Routine to search a database to retrieve search entries and program guide data that corresponds to each search entry based on retrieving the plurality of stored search entries:
804
805   Receive instances of Search Entries
806   For each instance of Search Entries:
807       Query database containing search entries and media assets associated with each search entries for entries matching the instance of Search Entries
808           If (Number of matching entries > 0)
809               Retrieve media assets from database entries matching the instance of Search Entries
810               Execute Subroutine to retrieve program guide data associated with the media asset listed as related to the search entry using control circuitry
811           Else If (Number of similar entries > 0)
812               Execute Subroutine to retrieve program guide data associated with the media asset listed as related to the related search entry using control circuitry
813           Else
814               Execute Subroutine to remove search entry from list of search entries being retrieved from storage using control circuitry
815   Execute Subroutine to generate a preference level for each search entry of the plurality of search entries based on the frequency of each search entry of the plurality of search entries using control circuitry
816 ...
817 Termination Subroutine
818 ...

FIG. 8

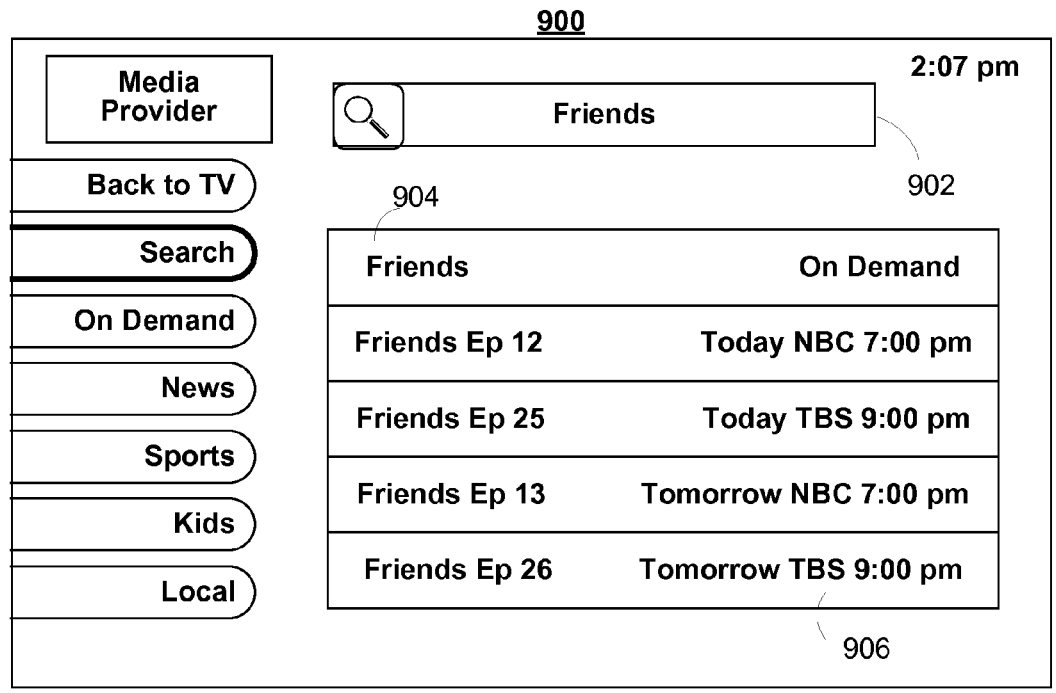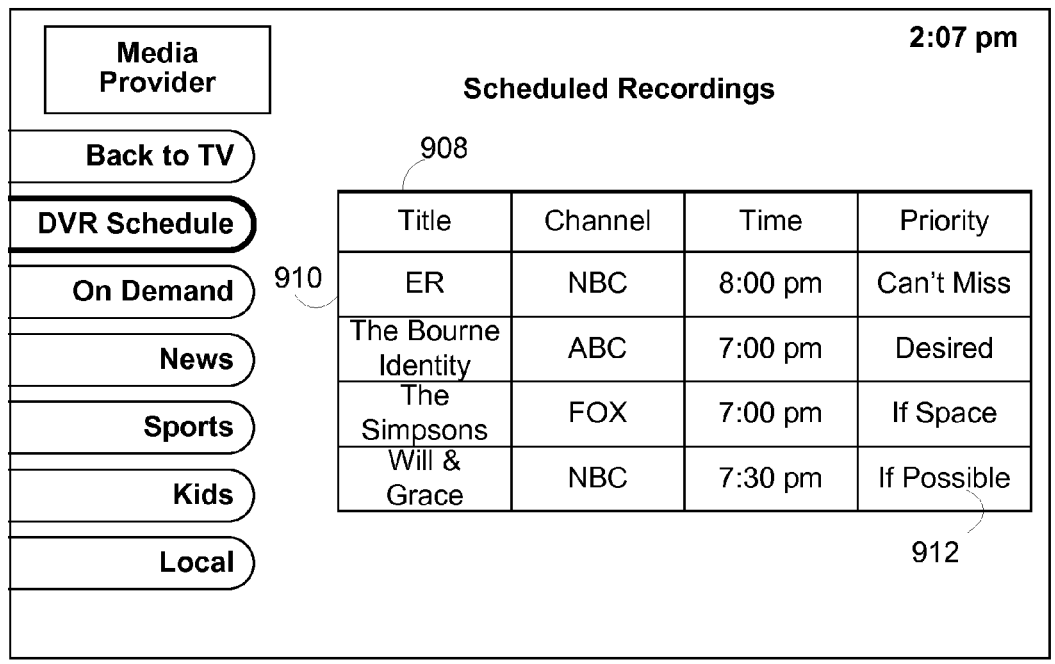
FIG. 9

US 9,848,242 B2

1

SYSTEMS AND METHODS FOR ADJUSTING THE PRIORITY OF MEDIA ASSETS SCHEDULED TO BE RECORDED

BACKGROUND

There are a variety of systems that work to manage scheduled recordings of media assets. Often, these systems include the use of priorities, assigned to the media assets by the user or determined for each media asset based upon the viewing history, for use in resolving scheduling conflicts and resource allocation concerns for the scheduled recordings. As the behavior and interests of the user changes, these systems may no longer accurately reflect the interests of the user. For example, a user starts out by scheduling recordings for a TV series. Later, the user finds a new preferred TV series with episodes broadcast at a similar time but does not bother changing the scheduled recording for the first series. As the device runs out of memory to store upcoming programs, the user is unaware that the episodes of the first TV show accounts for a growing amount of memory that could otherwise be used for the preferred TV show.

SUMMARY

Systems and methods are described herein for adjusting a priority of media assets scheduled to be recorded to reflect the current behavior and interests of the user. For example, a household with young children may have a recording schedule for the DVR with a wide variety of television shows of different genres (e.g., Children's Shows, Sports Games, and Crime Procedurals) and as the children grow up, the preference may gradually shift towards other types of shows. As this shift of interest happens over time, it can be difficult or impossible for the user to change the priority of each of the media assets on the recording schedule each time the interests of the user changes an incremental amount.

In some aspects, control circuitry may store, in storage circuitry, search behavior of a user, in which the search behavior includes both a plurality of search entries and the frequency of occurrence of each search entry of the plurality of search entries. For example, control circuitry may store a list of search entries input by the user such as "ER; Matt Damon; Oceans Eleven; News; Friends; Oceans Eleven; George Clooney; Friends; Weather; Yankees; Will and Grace", where an entry can occur more than once. In some embodiments, each search entry of the plurality of search entries may include at least one of keywords, program titles, or related people. For example, the search entry may refer to a specific television series or a favorite actor (e.g., ER, Friends, Matt Damon, George Clooney).

Control circuitry may retrieve, from the storage circuitry, the search behavior along with program guide data that corresponds to each search entry of the plurality of search entries. For example, control circuitry may retrieve each of the entries of the list of entries stored, such as "ER; Matt Damon; Oceans Eleven; News; Friends; Oceans Eleven; George Clooney; Friends; Weather; Yankees; Will and Grace" as well as the program guide data, such as program title (e.g., News at 10, The Monuments Men), genre (e.g., Sit-Com, Action Movie), and/or broadcast time (e.g., 7 pm, 8 pm, 10 pm) associated with the television shows or media assets associated with each search entry.

Control circuitry may generate a preference level for each search entry of the plurality of search entries based on the frequency of occurrence of each search entry of the plurality of search entries. In some embodiments, when generating a

2 preference level for each search entry, control circuitry may rank the plurality of search entries by the frequency of occurrence of each search entry of the plurality of search entries and assign to each respective search entry of the plurality of search entries a corresponding preference level, in which each corresponding preference level reflects a respective ranking. For example, control circuitry may sort the list of search entries such as "ER; Matt Damon; Oceans Eleven; News; Friends; Yankees; Oceans Eleven; George Clooney; ER; Weather; Yankees; ER; Friends;" by frequency of occurrence to determine that the search entries ranked in order of frequency of occurrence is "ER; Oceans Eleven; Friends; Yankees; Matt Damon; News; George Clooney; Weather; Will and Grace". Control circuitry may determine that a top portion of the search entries (e.g., entries listed at the top of the list) such as "ER" may be a "high" preference level, a middle portion of the search entries (e.g., entries listed in the middle of the list) such as "Oceans Eleven" and "Friends" may be a medium preference level, and a bottom portion of the search entries (e.g., entries listed at the bottom of the list) such as "News", "Weather", "Yankees" and "Will and Grace" may be a "low preference level". Control circuitry may determine that search entries such as "Matt Damon" and "George Clooney" which are related to the search entry "Oceans Eleven" have the same preference level as "Oceans Eleven" even though each of the search entries does not share the frequency, so that both "Matt Damon" and "George Clooney" have a "medium" preference level.

Control circuitry may match the search behavior with program guide data and the corresponding preference level for each search entry of the plurality of search entries to generate a search profile for the user. For example, control circuitry may match the preference levels of the various television shows (e.g., "ER" with a "high" preference level, "Friends" with a "medium" preference level, "Will and Grace" "low" preference level) that the user has searched for with the program guide data to determine trends in the interests of the user, such as determining that the user likes Sit-Coms but prefers Drama television shows and Action Movies.

Control circuitry may determine, based on the search profile, a matching score between the search profile and each media asset of a plurality of media assets that the user has scheduled to be recorded. In some embodiments, when determining the matching score, control circuitry may retrieve program guide data for each media asset of the plurality of media assets and compare respective program guide data for each respective media asset of the plurality of media assets with the program guide data in the search profile to generate an expected preference level for each media asset of the plurality of media assets based on the search profile. For example, control circuitry may retrieve the media assets scheduled to be recorded such as "The Bourne Ultimatum; The Simpsons; ER; Will and Grace." Control circuitry may determine that one of the media assets scheduled to be recorded (e.g., The Bourne Ultimatum) has program guide data that is present in the search profile, (e.g., an action movie with Matt Damon), which means the search profile can be used to calculate an expected preference level and recording priority. Control circuitry may determine that another media asset scheduled for recording is a television show which does not match any information available on the search profile (e.g., The Simpsons), which means that the search profile does not provide any information to help calculate expected preference level and recording priority.

Control circuitry may then retrieve a respective current recording priority of each media asset of the plurality of media assets and determine a respective expected recording priority for each media asset of the plurality of media assets based on the expected preference level for each media asset of the plurality of media assets based on the search profile. For example, control circuitry may determine that "The Bourne Ultimatum" has a "desired" recording priority as set by the user while setting up the recording schedule. Control circuitry may determine that because "The Bourne Ultimatum" is an action movie with Matt Damon and both "action movie" and "Matt Damon" are associated with "medium" preference level, "The Bourne Ultimatum" has a "medium" expected preference level. Control circuitry may then determine that the "medium" expected preference level indicates that the expected recording priority is "can't miss". In another example, control circuitry may determine that the shows "ER" and "Will and Grace" have a "high" and "low" expected preference level respectively because the search profile lists a "high" preference level for the show "ER" and a "low" preference level for the show "Will and Grace". Control circuitry may then determine that "ER" has an expected recording priority of "can't miss" and "Will and Grace" has an expected recording priority of "if space available".

In some embodiments, control circuitry may show recording priorities as a set of categories describing the priority such as "can't miss", "if possible", "desired", and "if space available". In some embodiments, control circuitry may have separate instructions for each recording priority regarding how long to keep the recorded media asset, how to handle scheduling conflicts with limited tuner availability, and/or how to handle limited storage capacity for future recordings. For example, a "can't miss" recording priority may indicate that the program must be recorded, in preference to all other programs airing simultaneously, and recordings may be deleted to clear space for the program. In another example, an "if possible" priority may indicate that the program should be recorded if at all possible, unless there are conflicts with can't miss programs airing simultaneously, or unless any can't miss programs that are recorded would have to be deleted. In yet another example, a "desired" priority may indicate that the user would like the program to be recorded, unless there are conflicts with can't miss priority programs or with if possible priority programs, or unless any can't miss priority programs or if possible priority programs that are recorded would have to be deleted. In yet another example, an "if space available" priority may indicate that the program should be recorded if there is space to do so and if it does not conflict with any higher priority programs.

In order to indicate whether the media asset matches the search profile, control circuitry may then determine the matching score based on how close the expected recording priority, which was calculated based on the search profile, matches the current recording priority of the media asset. For example, control circuitry may determine that the current recording priority of The Bourne Ultimatum (e.g., "desired") does not match the expected recording priority (e.g., "can't miss") and determine a matching score indicating that the current recording priority does not match the search profile and needs to be increased. In another example, control circuitry may determine that the current recording priority of "ER" (e.g., "can't miss") matches the expected recording priority (e.g., "can't miss") and determine a matching score which indicates the match. In yet another example, control circuitry may determine that the current recording priority of "Will and Grace" (e.g., "if possible") does not match the expected recording priority (e.g., "if space available") and determine a matching score indicating that the current recording priority does not match the search profile and needs to be decreased.

Control circuitry may automatically adjust recording priorities corresponding to each respective media asset of the plurality of media assets that the user has scheduled to be recorded based on the matching score. In some embodiments, control circuitry may increase or decrease the recording priority of a media asset of the plurality of media assets based on the matching score, in which the matching score of the media asset indicates that the expected recording priority of the media asset is higher or lower than the current recording priority of the media asset and the amount of increasing or decreasing the current recording priority of the media asset is a predetermined increment. For example, control circuitry may increase the current recording priority of "The Bourne Ultimatum" a single level, from "desired" to "if possible". In another example, control circuitry may decrease the current recording priority of "Will and Grace" a single level from "if possible" to "desired".

In some embodiments, control circuitry may set the current recording priority of the media asset to match the expected recording priority of the media asset based on the matching score, in which the matching score indicates the difference between the current recording priority of the media asset and the expected recording priority of the media asset. For example, control circuitry may increase the current recording priority of "The Bourne Ultimatum" to match the expected recording priority by increasing the current recording priority from "desired" to "can't miss". In another example, control circuitry may decrease the current recording priority of "Will and Grace" to match the expected recording priority by decreasing the current recording priority from "desired" to "if space available".

In some embodiments, when adjusting the recording priorities, control circuitry may determine an available storage capacity of a device including storage with respect to a given period and determine an amount of the respective media assets of the plurality of media assets that the user has scheduled to be recorded that corresponds to the available storage capacity. For example, control circuitry may set a maximum number of media assets that can be recorded based on the available storage and select that amount of media assets scheduled to be recorded with the highest recording priority. Control circuitry may then retain, for the given period, a scheduling of each respective media asset of the plurality of media assets that the user has scheduled to be recorded for each respective media asset that has a corresponding recording priority that is equal to or less than the amount and unschedule a remainder of the plurality of media assets for recording for the given period. For example, control circuitry may keep the scheduled recordings of any of the media assets with the highest recording priorities up to the set maximum number and remove any additional media assets from the recording schedule.

In some embodiments, control circuitry may isolate a set of the search behavior that corresponds to data stored within a predetermined period of time relative to a present time and may generate the preference level based only on the set of the search behavior. For example, control circuitry may access search entries input by the user within the last three months and determine the preference levels based only on the search entries within that period.

In some embodiments, control circuitry may notify the user of changes to the scheduled recordings based on the adjusted recording priorities. For example, control circuitry may notify the user through a notification on the screen of the television how the adjusted recording priority of the action movie (e.g., The Bourne Ultimatum) affected the recording schedule.

In some embodiments, control circuitry may receive user input that indicates approval or disapproval of the adjusted recording priorities and alter the search profile based on the approval or disapproval of the user. For example, control circuitry may receive from the user an indication of disapproval of the change to the schedule, and based on the associated adjusted recording priority, alter the search profile to prevent similar changes in the future.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows pseudocode of an algorithm for determining a matching score based on the media assets scheduled to be recorded and the user profile, in accordance with some embodiments of the disclosure;

FIG. 8 shows pseudocode of an algorithm for searching a database to retrieve search entries and program guide data that corresponds to each search entry, in accordance with some embodiments of the disclosure;

FIG. 9 shows an illustrative example of media guidance displays that may be presented in accordance with some embodiments of the disclosure;

DETAILED DESCRIPTION

Figure 1:
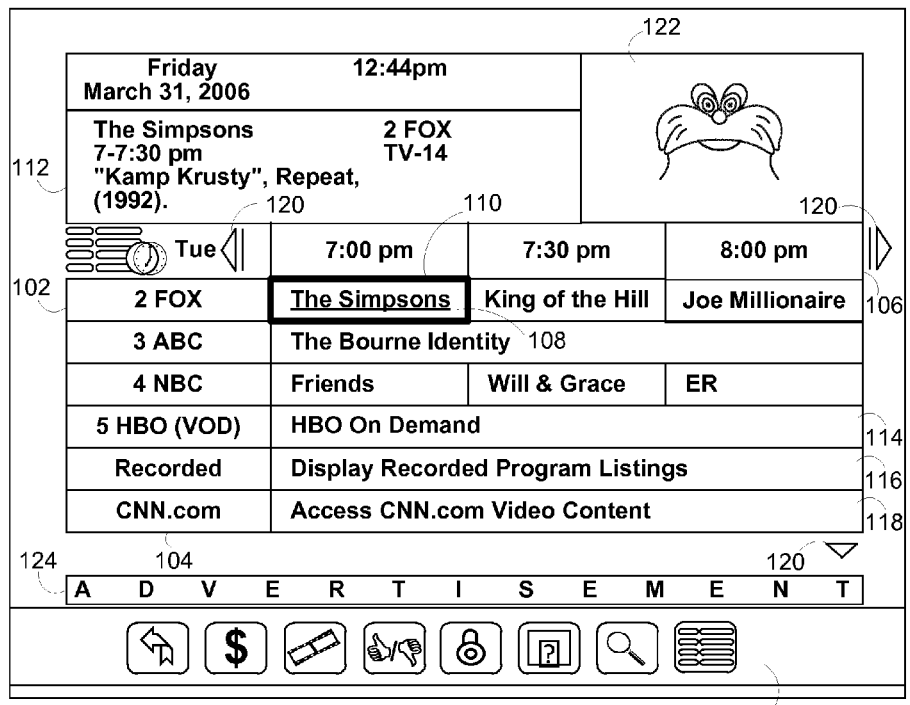
FIG. 1 shows an illustrative example of a media guidance display that may be presented in accordance with some embodiments of the disclosure.

Systems and methods are described herein for adjusting the priority of media assets scheduled to be recorded to reflect the current behavior and interests of the user. For example, a household with young children may have a recording schedule for the DVR with a wide variety of television shows of different genres (e.g., Children's Shows, Sports Games, and Crime Procedurals) and as the children grow up, the preference may gradually shift towards other types of shows. As this shift of interest happens over time, it can be difficult or impossible for the user to change the priority of each of the media assets on the recording schedule each time the interests of the user changes an incremental amount.

In some aspects, control circuitry may store, in storage circuitry, search behavior of a user, in which the search behavior includes both a plurality of search entries and the frequency of occurrence of each search entry of the plurality of search entries. For example, control circuitry may store a list of search entries input by the user such as "ER; Matt Damon; Oceans Eleven; News; Friends; Oceans Eleven; George Clooney; Friends; Weather; Yankees; Will and Grace", where an entry can occur more than once. In some embodiments, each search entry of the plurality of search entries may include at least one of keywords, program titles, or related people. For example, the search entry may refer to a specific television series or a favorite actor (e.g., ER, Friends, Matt Damon, George Clooney).

Control circuitry may retrieve, from the storage circuitry, the search behavior along with program guide data that corresponds to each search entry of the plurality of search entries. For example, control circuitry may retrieve each of the entries of the list of entries stored, such as "ER; Matt Damon; Oceans Eleven; News; Friends; Oceans Eleven; George Clooney; Friends; Weather; Yankees; Will and Grace" as well the program guide data, such as program title (e.g., News at 10, The Monuments Men), genre (e.g., Sit-Com, Action Movie), and/or broadcast time (e.g., 7 pm, 8 pm, 10 pm) associated with the television shows or media assets associated with each search entry.

Control circuitry may generate a preference level for each search entry of the plurality of search entries based on the frequency of occurrence of each search entry of the plurality of search entries. In some embodiments, when generating a preference level for each search entry, control circuitry may rank the plurality of search entries by the frequency of occurrence of each search entry of the plurality of search entries and assign to each respective search entry of the plurality of search entries a corresponding preference level, in which each corresponding preference level reflects a respective ranking. For example, control circuitry may sort the list of search entries such as "ER; Matt Damon; Oceans Eleven; News; Friends; Yankees; Oceans Eleven; George Clooney; ER; Weather; Yankees; ER; Friends;" by frequency of occurrence to determine that the search entries ranked in order of frequency of occurrence is "ER; Oceans Eleven; Friends; Yankees; Matt Damon; News; George Clooney; Weather; Will and Grace". Control circuitry may determine that a top portion of the search entries such as "ER" may be a "high" preference level, a middle portion of the search entries such as "Oceans Eleven" and "Friends" may be a medium preference level, and a bottom portion of the search entries such as "News", "Weather", "Yankees" and "Will and Grace" may be a "low preference level". Control circuitry may determine that search entries such as "Matt Damon" and "George Clooney" which are related to the search entry "Oceans Eleven" have the same preference level as "Oceans Eleven" even though each of the search entries does not share the frequency, so that both "Matt Damon" and "George Clooney" have a "medium" preference level.

Control circuitry may match the search behavior with program guide data and the corresponding preference level for each search entry of the plurality of search entries to generate a search profile for the user. For example, control circuitry may match the preference levels of the various television shows (e.g., "ER" with a "high" preference level, "Friends" with a "medium" preference level, "Will and Grace" "low" preference level) that the user has searched for with the program guide data to determine trends in the interests of the user, such as determining that the user likes Sit-Coms but prefers Drama television shows and Action Movies.

Control circuitry may determine, based on the search profile, a matching score between the search profile and each media asset of a plurality of media assets that the user has scheduled to be recorded. In some embodiments, when determining the matching score, control circuitry may retrieve program guide data for each media asset of the plurality of media assets and compare respective program guide data for each respective media asset of the plurality of media assets with the program guide data in the search profile to generate an expected preference level for each media asset of the plurality of media assets based on the search profile. For example, control circuitry may retrieve the media assets scheduled to be recorded such as "The Bourne Ultimatum; The Simpsons; ER; Will and Grace." Control circuitry may determine that one of the media assets scheduled to be recorded (e.g., The Bourne Ultimatum) has program guide data that is present in the search profile, (e.g., an action movie with Matt Damon), which means the search profile can be used to calculate an expected preference level and recording priority. Control circuitry may determine that another media asset scheduled for recording is a television show which does not match any information available on the search profile (e.g., The Simpsons), which means that the search profile does not provide any information to help calculate expected preference level and recording priority.

Control circuitry may then retrieve a respective current recording priority of each media asset of the plurality of media assets and determine a respective expected recording priority for each media asset of the plurality of media assets based on the expected preference level for each media asset of the plurality of media assets based on the search profile. For example, control circuitry may determine that "The Bourne Ultimatum" has a "desired" recording priority as set by the user while setting up the recording schedule. Control circuitry may determine that because "The Bourne Ultimatum" is an action movie with Matt Damon and both "action movie" and "Matt Damon" are associated with "medium" preference level, "The Bourne Ultimatum" has a "medium" expected preference level. Control circuitry may then determine that the "medium" expected preference level indicates that the expected recording priority is "can't miss". In another example, control circuitry may determine that the shows "ER" and "Will and Grace" have a "high" and "low" expected preference level respectively because the search profile lists a "high" preference level for the show "ER" and a "low" preference level for the show "Will and Grace". Control circuitry may then determine that "ER" has an expected recording priority of "can't miss" and "Will and Grace" has an expected recording priority of "if space available".

In some embodiments, control circuitry may show recording priorities as a set of categories describing the priority such as "can't miss", "if possible", "desired", and "if space available". In some embodiments, control circuitry may have separate instructions for each recording priority regarding how long to keep the recorded media asset, how to handle scheduling conflicts with limited tuner availability, and/or how to handle limited storage capacity for future recordings. For example, a "can't miss" recording priority may indicate that the program must be recorded, in preference to all other programs airing simultaneously, and recordings may be deleted to clear space for the program. In another example, an "if possible" priority may indicate that the program should be recorded if at all possible, unless there are conflicts with can't miss programs airing simultaneously, or unless any can't miss programs that are recorded would have to be deleted. In yet another example, a "desired" priority may indicate that the user would like the program to be recorded, unless there are conflicts with can't miss priority programs or with if possible priority programs, or unless any can't miss priority programs or if possible priority programs that are recorded would have to be deleted. In yet another example, an "if space available" priority may indicate that the program should be recorded if there is space to do so and if it does not conflict with any higher priority programs.

In order to indicate whether the media asset matches the search profile, control circuitry may then determine the matching score based on how close the expected recording priority, which was calculated based on the search profile, matches the current recording priority of the media asset. For example, control circuitry may determine that the current recording priority of The Bourne Ultimatum (e.g., "desired") does not match the expected recording priority (e.g., "can't miss") and determine a matching score indicating that the current recording priority does not match the search profile and needs to be increased. In another example, control circuitry may determine that the current recording priority of "ER" (e.g., "can't miss") matches the expected recording priority (e.g., "can't miss") and determine a matching score which indicates the match. In yet another example, control circuitry may determine that the current recording priority of "Will and Grace" (e.g., "if possible") does not match the expected recording priority (e.g., "if space available") and determine a matching score indicating that the current recording priority does not match the search profile and needs to be decreased.

Control circuitry may automatically adjust recording priorities corresponding to each respective media asset of the plurality of media assets that the user has scheduled to be recorded based on the matching score. In some embodiments, control circuitry may increase or decrease the recording priority of a media asset of the plurality of media assets based on the matching score, in which the matching score of the media asset indicates that the expected recording priority of the media asset is higher or lower than the current recording priority of the media asset and the amount of increasing or decreasing the current recording priority of the media asset is a predetermined increment. For example, control circuitry may increase the current recording priority of "The Bourne Ultimatum" a single level, from "desired" to "if possible". In another example, control circuitry may decrease the current recording priority of "Will and Grace" a single level from "if possible" to "desired".

In some embodiments, control circuitry may set the current recording priority of the media asset to match the expected recording priority of the media asset based on the matching score, in which the matching score indicates the difference between the current recording priority of the media asset and the expected recording priority of the media asset. For example, control circuitry may increase the current recording priority of "The Bourne Ultimatum" to match the expected recording priority by increasing the current recording priority from "desired" to "can't miss". In another example, control circuitry may decrease the current recording priority of "Will and Grace" to match the expected recording priority by decreasing the current recording priority from "desired" to "if space available".

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
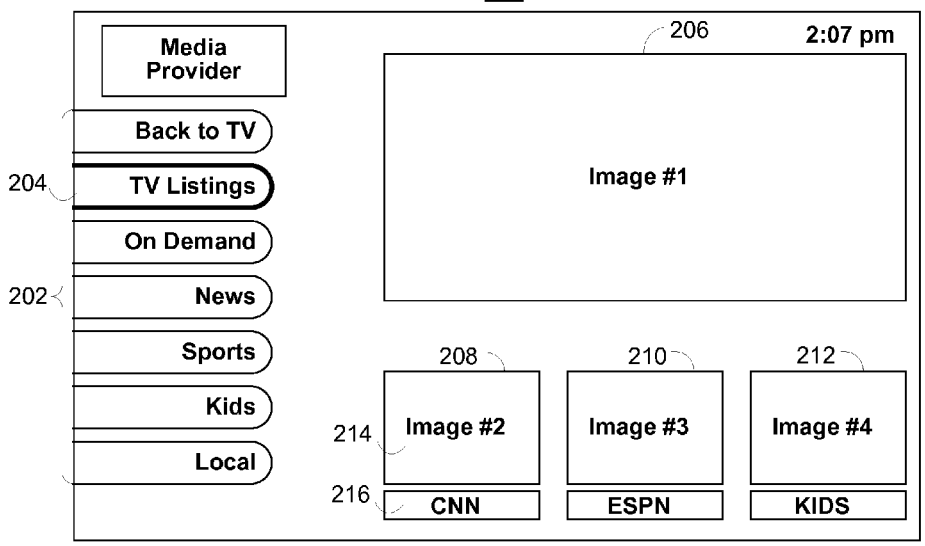
FIG. 2 shows another illustrative example of a media guidance display that may be presented in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
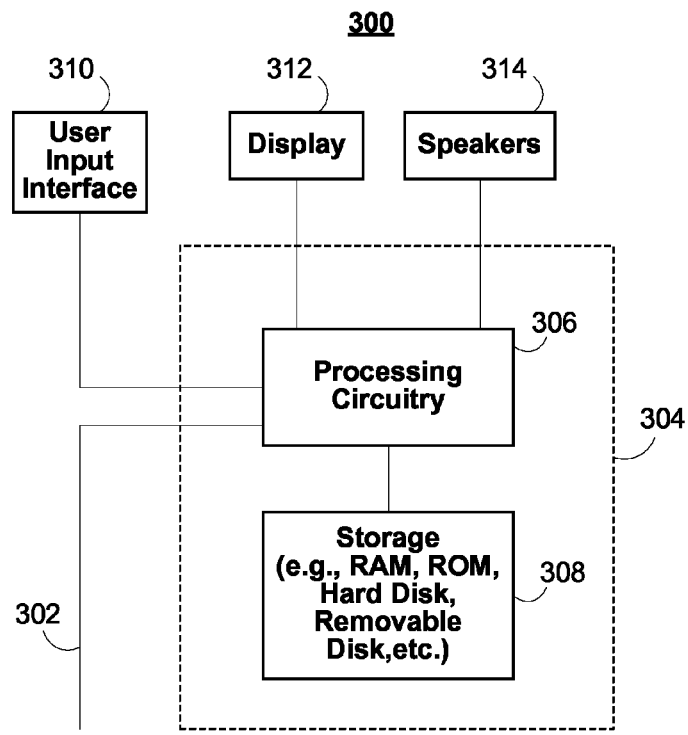
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
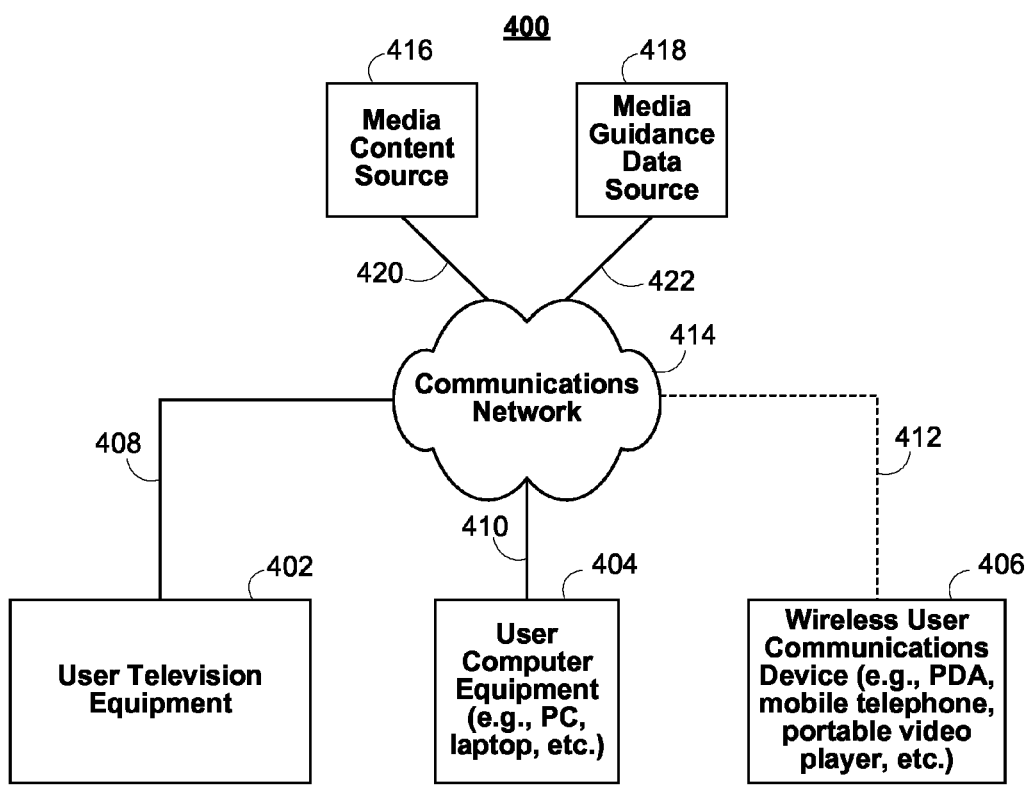
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, and wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, programs that the user searches for, programs the user selects when searching for content, etc.). In some embodiments, media guidance data may data may include an analysis of the viewer data. For example, the analysis of the viewer data may include an analysis of the historical user activity information (e.g., frequency of use of phrases and search terms, frequency at which user changes content selection, time spent watching a given channel). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed).

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct control circuitry to generate the guidance application displays and transmit the generated displays to the user equipment devices. The server application may instruct control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

As referred herein, the term "matching score" refers the measure of the relationship between two values. For example, the matching score may represent a measure of the relationship between the current settings for the recording of a media asset and the interests of a user specified in the search profile of the user. The matching score may be determined by comparing an expected or calculated recording priority based on the information from the search profile regarding what the user is interested in with the actual or current recording priority. The matching score may be an indicator of how much the current recording priority of the media asset matches the search profile. In some embodiments, control circuitry 304 may receive the current recording priority from the user while receiving a selection of the media asset to be included in the list of programs scheduled for recording. In some embodiments, control circuitry 304 may set the current recording priority automatically based on a default setting or information from a user profile.

In some embodiments, control circuitry 304 may calculate the expected recording priority by matching the program guide data of the media assets scheduled to be recorded to the elements of other media assets that are identified in the search profile as of interest to the user. For example, control circuitry 304 may analyze a movie (e.g., The Bourne Ultimatum) and determine that one of the principle actors (e.g., Matt Damon) is already in the search profile and so calculate the expected recording priority based on the expected preference level of the actor (e.g., Matt Damon). By matching the program guide data to similar program guide data of other programs with respective preference levels, control circuitry 304 may determine the expected preference level for the media asset. For example, if the search profile indicates a high preference level for an actor (e.g., Matt Damon) based on the high frequency of occurrence of the actor and related search terms (e.g., Oceans Eleven) in the search behavior, control circuitry 304 may determine that any media asset scheduled to be recorded (e.g., The Bourne Ultimatum) which includes the actor (e.g., Matt Damon) has a high expected preference level. Control circuitry 304 may determine the expected recording priority by assigning the media asset an expected recording priority based on the expected preference level and the settings of the user regarding the preference level threshold for each recording priority level. For example, in some embodiments, control circuitry 304 may determine that an expected preference level of "medium" or higher indicates an expected recording priority of "can't miss". In some embodiments, the matching score may be set to one of three possible values based on whether the current recording priority is greater than, less than, or equal to the expected recording priority. In some embodiments, in order to indicate whether the media asset matches the search profile, control circuitry 304 may calculate the matching score to represent the offset between the current recording priority of the media asset and the expected recording priority calculated from the search profile.

Figure 5:
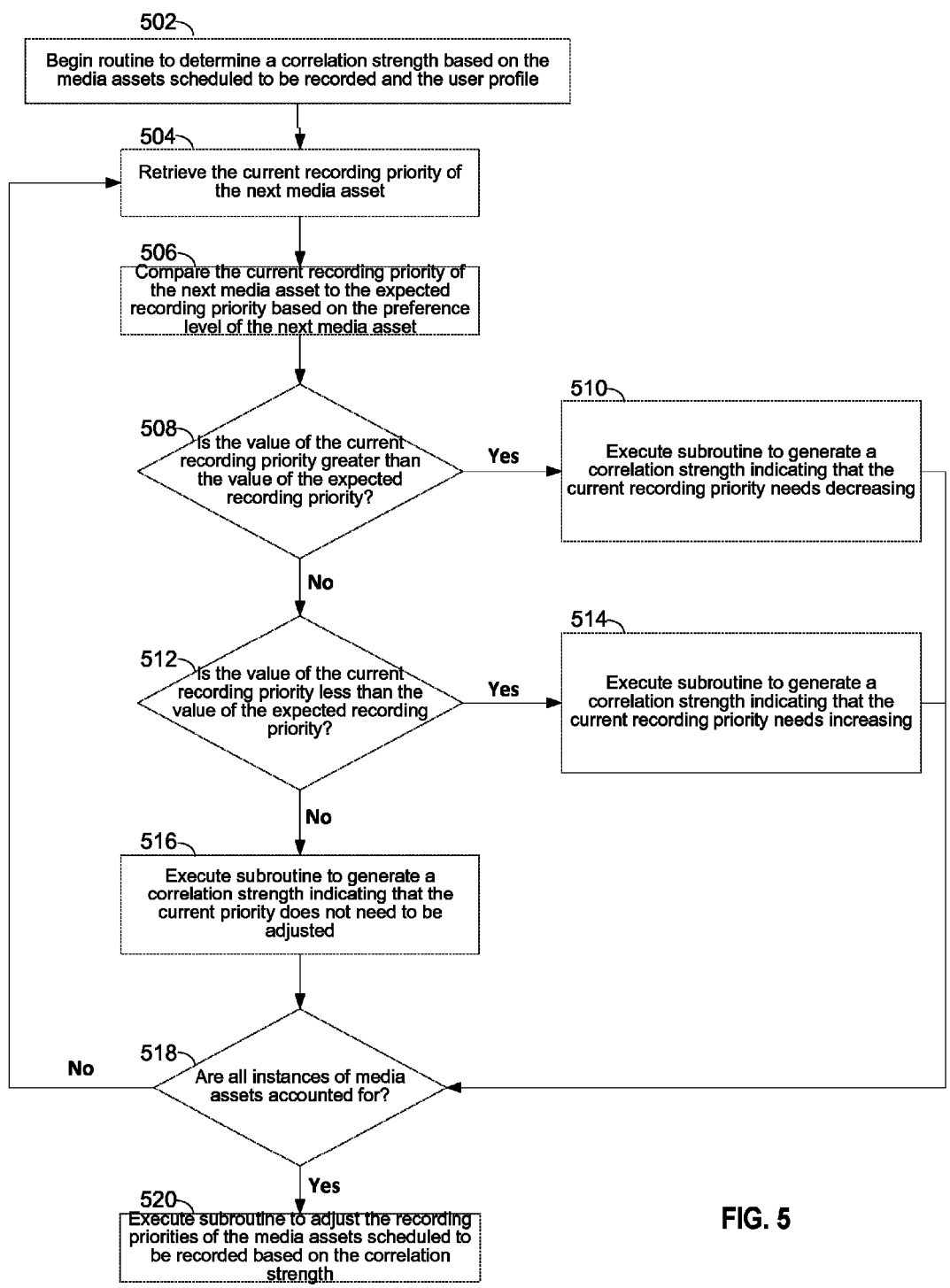
FIG. 5 shows a flowchart of illustrative steps for determining a matching score based on the media assets scheduled to be recorded and the user profile, in accordance with some embodiments of the disclosure.

FIGS. 5 and 6 present an algorithm for control circuitry (e.g., control circuitry 304) to determine a matching score based on the media assets scheduled to be recorded in accordance with some embodiments of the disclosure. In some embodiments, this algorithm may be encoded on to a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to determine a matching score based on the media assets scheduled to be recorded and the user profile in accordance with some embodiments of the disclosure.

At 502, the algorithm to determine a matching score may begin based on the media assets scheduled to be recorded and the user profile. In some embodiments, this may be done either directly or indirectly in response to a user action or input (e.g., from signals received by control circuitry 304 or user input interface 310). For example, the algorithm may begin directly in response to control circuitry 304 receiving signals from user input interface 310, or control circuitry 304 may prompt the user to confirm their input using a display (e.g., by generating a prompt to be displayed on display 312) prior to running the algorithm.

At 504, control circuitry 304 proceeds to retrieve the current recording priority of the next media asset. In some embodiments, control circuitry 304 may receive a single primitive data structure that represents the value of the current recording priority of the next media asset. In some embodiments, the value may be stored as part of a larger data structure, and control circuitry 304 may retrieve the value by executing appropriate accessor methods to retrieve the value from the larger data structure.

At 506, control circuitry 304 proceeds to compare the value of the current recording priority of the next media asset to the stored value of expected recording priority based on the expected preference level of the next media asset. In some embodiments, the value of expected recording priority based on the expected preference level of the next media asset may be stored (e.g., on storage device 308) prior to beginning the algorithm. In some embodiments, the value of expected recording priority based on the expected preference level of the next media asset may also be retrieved for each and every instance of current recording priority of the next media asset, and the value of expected recording priority based on the expected preference level of the next media asset may change from iteration to iteration. In some embodiments, control circuitry 304 may directly compare the value of the expected recording priority based on the expected preference level of the next media asset with the value of the current recording priority of the next media asset by accessing the values respectively from memory and performing a value comparison. In some instances, control circuitry 304 may call a comparison function (e.g., for object-to-object comparison) to compare the current recording priority of the next media asset and expected recording priority based on the expected preference level of the next media asset.

At 508, control circuitry 304 compares the values of the current recording priority of the next media asset and expected recording priority based on the expected preference level of the next media asset to determine if the value of the current recording priority of the next media asset is greater than the value of expected recording priority based on the expected preference level of the next media asset. If the condition is satisfied, the algorithm may proceed to step 510; if the condition is not satisfied, the algorithm may proceed to step 512 instead.

At 510, control circuitry 304 may execute a subroutine to generate a matching score indicating that the current recording priority needs decreasing based on the condition at 508 being satisfied in which the matching score is set to indicate the difference between the current recording priority and the expected recording priority. After the subroutine is executed, the algorithm may proceed to 518 where it is determined if all instances of the current recording priority of the next media asset are accounted for and further iterations are needed.

At 512, control circuitry 304 compares the values of the current recording priority of the next media asset and expected recording priority based on the expected preference level of the next media asset to determine if the value of the current recording priority of the next media asset is less than the value of expected recording priority based on the expected preference level of the next media asset. If the condition is satisfied, the algorithm may proceed to 514; if the condition is not satisfied, the algorithm may proceed to 516 instead.

At 514, control circuitry 304 may execute a subroutine to generate a matching score indicating that the current recording priority needs increasing based on the condition of 512 being satisfied in which the matching score is set to indicate the difference between the current recording priority and the expected recording priority. After the subroutine is executed, the algorithm may proceed to 518 where it is determined if all instances of the current recording priority of the next media asset are accounted for and if further iterations are needed.

At 516, control circuitry 304 may execute a subroutine to generate a matching score indicating that the current recording priority does not need to be adjusted based on both of the conditions in 508 and 512 not being satisfied. The matching score is set to indicate that expected interests of the user based on the search profile are matched to the current recording priorities and so adjustment and/or correction is not needed. After the subroutine is executed, the algorithm may proceed to 518 where it is determined if all instances of the current recording priority of the next media asset are accounted for and if further iterations are needed.

At 518, control circuitry 304 may check if all instances of the current recording priority of the next media asset are accounted for. If all of the instances have been evaluated, control circuitry 304 may proceed to 520. For example, control circuitry 304 may call a function to see if there is a next element of the media assets scheduled to be recorded. If the function returns true (i.e., there are still instances that need to be processed), control circuitry 304 may proceed to 504.

At 520, control circuitry 304 may execute a subroutine to adjust the recording priorities of the media assets scheduled to be recorded based on the matching score. As the matching score that the expectation set by the profile does not match the current recording priority, the current recording priority is adjusting to match the expectation by increasing or decreasing the current recording priority appropriately.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments, several instances of the current recording priority of the next media asset may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to determine a matching score based on the media assets scheduled to be recorded and the user profile in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, the algorithm may run a subroutine to initialize variables and prepare to determine a matching score based on the media assets scheduled to be recorded and the user profile, which begins on line 605. For example, in some embodiments, control circuitry 304 may copy instructions from a non-transitory storage medium (e.g., storage device 308) into RAM or into the cache for processing circuitry 306 during the initialization stage. Additionally, in some embodiments, the value of the expected recording priority based on the expected preference level of the next media asset being used for comparison, or a tolerance level for determining if two values are essentially equivalent, may be retrieved, set, and stored at 601.

At line 605, control circuitry 304 may receive instances of the current recording priority of the next media asset. In some embodiments, these instances may be retrieved from memory. Control circuitry 304 may receive instances of the current recording priority of the next media asset by receiving, for example, a pointer to an array of values of the current recording priority of the next media asset. In another example, control circuitry 304 may receive an object of a class, such as an iterator object containing elements of the current recording priority of the next media asset.

At line 606, control circuitry 304 may iterate through the various instances of the current recording priority of the next media asset; if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 may store the value of the current recording priority of the instance next media asset into a temporary variable "A." In some embodiments, the value of the current recording priority of the next media asset will be stored as part of a larger data structure or class, and the value of the current recording priority of the next media asset may be obtained through appropriate accessor methods. In some embodiments, the current recording priority of the next media asset may be converted from a string or other non-numeric data type into a numeric data type by means of an appropriate hashing algorithm. In some embodiments, control circuitry 304 may call a function to perform a comparison of the current recording priority of the next media asset to expected recording priority based on the expected preference level of the next media asset. In some embodiments, the current recording priority of the next media asset may be encoded as a primitive data structure, and rather than using a temporary variable, the current recording priority of the next media asset may be directly used in the comparisons at lines 609 and 611.

At line 608, control circuitry 304 may store the value of expected recording priority based on the expected preference level of the next media asset into a temporary variable "B." Similar to the current recording priority of the next media asset, in some embodiments, the value of expected recording priority based on the expected preference level of the next media asset may be stored as part of a larger data structure or class, and the value of expected recording priority based on the expected preference level of the next media asset may be obtained through accessor methods. In some embodiments, expected recording priority based on the expected preference level of the next media asset may be converted from a string or other non-numeric data type into a numeric data type by means of an appropriate hashing algorithm, or expected recording priority based on the expected preference level of the next media asset may be a primitive data structure, and may be directly used in the comparisons at lines 609 and 611.

At line 609, control circuitry 304 compares the value of A to the value of B to see if they are essentially equivalent. This is achieved by subtracting the value of B from A, taking the absolute value of the difference, and then comparing the absolute value of the difference to a predetermined tolerance level. In some embodiments, the tolerance level may be a set percentage of either A or B. In some embodiments, the tolerance level may be a fixed number. For example, setting the tolerance level to a set multiple of machine epsilon may allow for the algorithm to account for small rounding errors that may result from the use of floating point arithmetic. In some embodiments, the tolerance level may be set to zero, or the condition inside the IF statement may be replaced with a strict equivalence between A and B.

At line 610, control circuitry 304 may execute a subroutine to generate a matching score indicating that the current recording priority does not need to be adjusted using control circuitry if the condition in line 609 is satisfied. The matching score is set to indicate that expected interests of the user based on the search profile are matched to the current recording priorities and so adjustment and/or correction is not needed. In some embodiments, this may be achieved by processing circuitry 306 sending the appropriate signals to control circuitry.

At line 611, control circuitry 304 may compare the value of A and B to determine if A is less than B. In some embodiments, this comparison will only be done if A is not essentially equivalent to B and the comparison in line 609 evaluates to FALSE.

At line 612, control circuitry 304 may execute a subroutine to generate a matching score indicating that the current recording priority needs increasing using control circuitry if the condition in line 611 is satisfied. The matching score is set to indicate the difference between the current recording priority and the expected recording priority.

At line 613, control circuitry 304 may determine whether neither condition in line 609 or 611 is satisfied. If neither condition is satisfied, then the instruction at line 614 may be evaluated and executed.

At line 614, control circuitry 304 may execute a subroutine to generate a matching score indicating that the current recording priority needs decreasing using control circuitry if neither of the conditions at lines 609 or 611 is satisfied. The matching score is set to indicate the difference between the current recording priority and the expected recording priority.

At line 616, control circuitry 304 may run a termination subroutine after the algorithm has performed its function. For example, in some embodiments, control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments, break conditions may be placed after lines 610 and 612 to speed operation, or the conditional statements may be replaced with a case-switch. In some embodiments, rather than iterating over all instances of the current recording priority of the next media asset at 506, in some embodiments, the code may be rewritten so control circuitry 304 is instructed to evaluate multiple instances of the current recording priority of the next media asset simultaneously on a plurality of processors or processor threads, lowering the number of iterations needed and potentially speeding up computation time.

Figure 7:
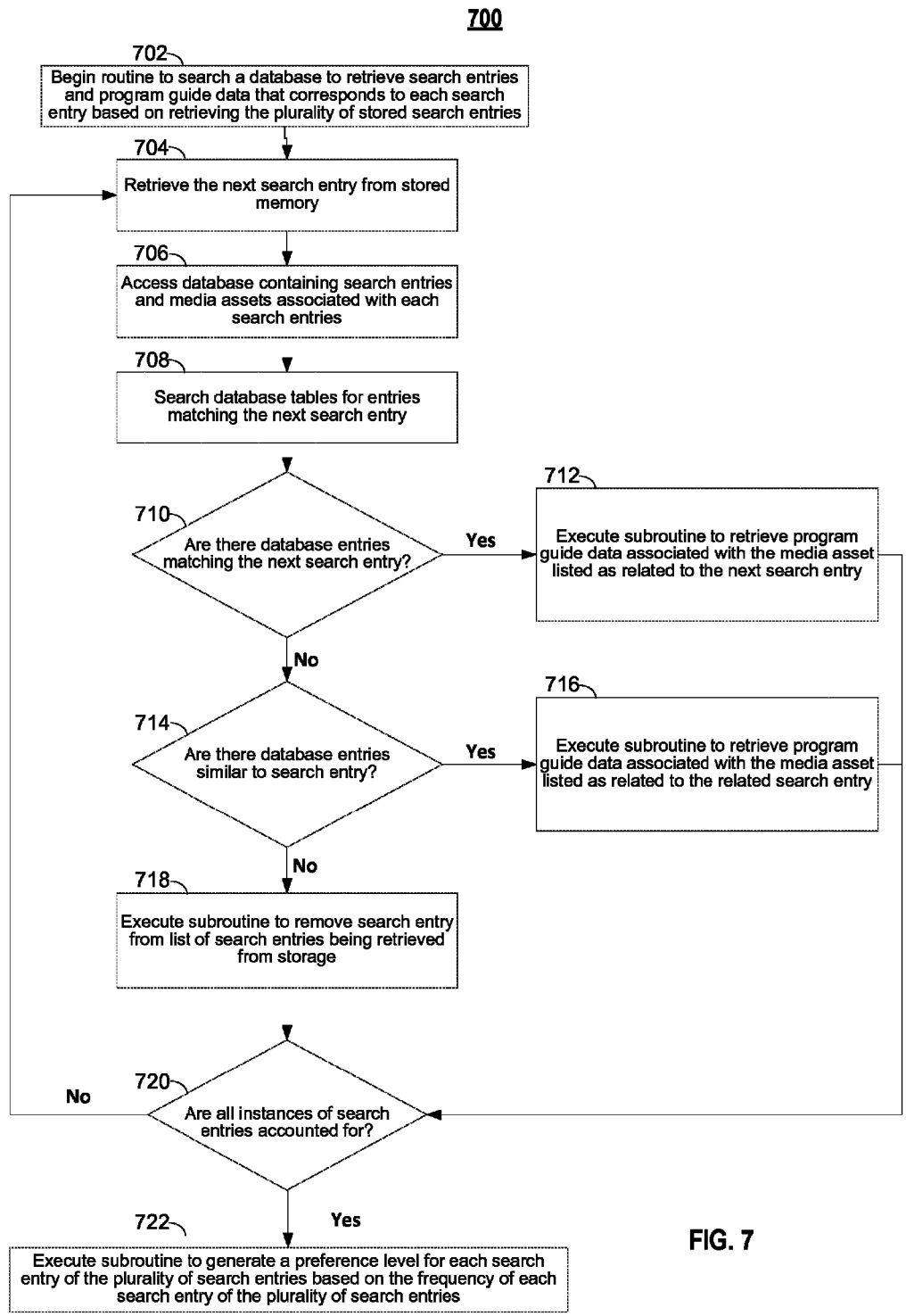
FIG. 7 shows a flowchart of illustrative steps for searching a database to retrieve search entries and program guide data that corresponds to each search entry, in accordance with some embodiments of the disclosure.

FIGS. 7 and 8 present an algorithm for control circuitry (e.g., control circuitry 304) to search a database to retrieve search entries and program guide data that corresponds to each search entry, using a database containing possible values of search entries in accordance with some embodiments of the disclosure. Similar to the algorithms described by FIGS. 5 and 6, in some embodiments, this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes an algorithm for control circuitry (e.g., control circuitry 304) to search a database and retrieve search entries and program guide data that corresponds to each search entry in accordance with some embodiments of the disclosure.

At 702, the algorithm to search a database and retrieve search entries and program guide data that corresponds to each search entry may begin based on retrieving the plurality of stored search entries. In some embodiments, this may be done either directly or indirectly in response to a user action or input (e.g., from signals received by control circuitry 304 or user input interface 310.)

At 704, control circuitry 304 proceeds to retrieve the next instance of search entries from stored memory. In some embodiments, control circuitry 304 may retrieve a single primitive data structure that represents the value of search entries. In some embodiments, control circuitry 304 may retrieve the value from a larger class or data structure.

At 706, control circuitry 304 accesses a database containing search entries and media assets associated with each search entry. In some embodiments, this database may be stored locally (e.g., on storage device 308) prior to beginning the algorithm. In some embodiments, the database may also be accessed by using communications circuitry to transmit information across a communications network (e.g., communications network 414) to a database implemented on a remote storage device (e.g., media guidance data source 418).

At 708, control circuitry 304 searches database tables for entries matching search entries. In some embodiments, this may be done by comparing an identifier, for example, a string or integer representing search entries, that matches the types of identifiers used inside the database. In some embodiments, control circuitry 304 may submit a general query to the database for table entries matching search entries, and control circuitry 304 may receive a list of indices or a data structure containing a portion of the database contents. In some embodiments, the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At 710, control circuitry 304 may determine if there are database entries matching search entries. In some embodiments, control circuitry 304 may receive a signal from the database indicating that there are no matching entries. In some embodiments, control circuitry 304 may instead receive a list of indices or data structures with a NULL or dummy value. If control circuitry 304 identifies that there are database entries matching search entries, the algorithm proceeds to step 712; otherwise, the algorithm proceeds to 714.

At 712, control circuitry 304 may execute a subroutine to retrieve program guide data associated with the media asset listed as related to the next search entry. Afterwards, the algorithm may proceed to step 720 where it is determined if there are further instances of search entries that need to be accounted for.

At 714, control circuitry 304 may determine if there are database entries similar to search entries. For example, in some embodiments, if search entries are encoded as a string with multiple characters, control circuitry 304 may perform additional database queries for similar strings with individual characters replaced, removed or added. In some embodiments, control circuitry 304 may also determine if the original query was a commonly misspelled word, and will submit a query with the correct spelling instead. In another example, search entries may be encoded as an integer; control circuitry 304 may perform additional queries for other integers within a certain range. In some embodiments, control circuitry 304 may retrieve database entries similar to search entries without requiring further queries. If control circuitry 304 identifies that there are database entries similar to search entries, the algorithm may proceed to 716; otherwise, the algorithm may proceed to 718.

At 716, control circuitry 304 may execute a subroutine to retrieve program guide data associated with the media asset listed as related to the related search entry. Afterwards, the algorithm may proceed to step 720.

At 718, control circuitry 304 may execute a subroutine to remove a search entry from the list of search entries being retrieved from storage after determining that there were no matching database entries for search entries. Afterwards, the algorithm may proceed to 720.

At 720, control circuitry 304 may determine if all instances of search entries are accounted for and if further iterations are needed. If further iterations are needed, the algorithm will loop back to 704 where control circuitry 304 may retrieve the next instance of search entries. If no further iterations are needed, the algorithm may proceed to 722.

At 722, control circuitry 304 may execute a subroutine to generate a preference level for each search entry of the plurality of search entries based on the frequency of occurrence of each search entry of the plurality of search entries.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. As a further example, although 712 and 716 are described as being mutually exclusive, both exact entries and similar entries may be processed for a single instance of search entries. To further this purpose, in some embodiments, step 710 and step 714 may be performed in parallel by control circuitry 304. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to search a database to retrieve search entries and program guide data that corresponds to each search entry based on retrieving the plurality of stored search entries in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the algorithm may run a subroutine to initialize variables and prepare to search a database to retrieve search entries and program guide data that corresponds to each search entry based on retrieving the plurality of stored search entries, which begins on line 805. For example, in some embodiments, control circuitry 304 may copy instructions from a non-transitory storage medium (e.g., storage device 308) into RAM or into the cache for processing circuitry 306 during the initialization stage.

At line 805, control circuitry 304 may receive instances of search entries. In some embodiments, these instances may be retrieved from stored memory.

At line 806, control circuitry 304 may iterate through the various instances of search entries; if only a single instance is available, the loop may only execute once. This loop may be implemented in multiple fashions depending on the choice of hardware and software language used to implement the algorithm of FIG. 8; for example, this may be implemented as part of a "for" or "while" loop, in some programming languages. In some embodiments, it may be convenient to store the instances of search entries in a single class or encapsulated data structure that may perform the loop as part of an internal method.

At line 807, control circuitry 304 may query a database for entries matching search entries. Depending on how the database is implemented and how search entries are stored, an intermittent step may be required to convert search entries into a form consistent with the database. For example, search entries may encode into a string or an integer using an appropriate hashing algorithm prior to being transmitted to the database by control circuitry 304 as part of a query. In some embodiments, search entries may be encoded as a primitive data structure, and control circuitry 304 may submit search entries as a query to the database directly. After querying the database, control circuitry 304 may receive a set of database entries matching search entries. In some embodiments, control circuitry 304 may receive these entries in the form of a data structure, a set of indices of the database, or a set of indices of another cross-referenced database.

At line 808, control circuitry 304 may determine if there are any database entries matching search entries. In some embodiments, control circuitry 304 may determine this by checking if the database returned an empty data structure or a NULL value in response to the query in line 807. If there are matching database entries, the algorithm may proceed to line 809. If there were no matching database entries, the algorithm may instead proceed to line 812.

At line 809, control circuitry 304 may retrieve one or more values of media assets from the database entries matching search entries. For example, if control circuitry 304 retrieves a list of indices after querying the database in line 807, in some embodiments, control circuitry 304 may retrieve the database entries for media assets located at the received indices. In some embodiments, the indices may point to a larger data structure contained within the database, and control circuitry 304 may retrieve the values of media assets from within the data structure using appropriate accessor methods. In some embodiments, control circuitry 304 may retrieve the values of media assets and store them in a separate data structure locally (e.g., in storage 308) prior to proceeding further. After retrieving the values of media assets, the algorithm may proceed to line 810.

At line 810, control circuitry 304 may execute a subroutine to use the values of media assets and retrieve program guide data associated with the media asset listed as related to the search entry using control circuitry. Afterwards, the algorithm may proceed to line 815.

At line 811, control circuitry 304 may determine if there are any database entries similar to search entries. For example, search entries may be represented by an object of a class. Control circuitry 304 may call a function to perform a fuzzy comparison (e.g., a comparison to identify similar objects of the class) by comparing specific fields of the class or by performing approximate string matching on data related to search entries. If database entries similar to search entries are found by control circuitry 304, then the algorithm may proceed to line 812. If control circuitry 304 does not find matching entries (e.g., a query to the database returns a NULL value), the algorithm may proceed to line 812.

At line 812, control circuitry 304 may execute a subroutine to use the values of media assets and retrieve program guide data associated with the media asset listed as related to the related search entry using control circuitry. Afterwards, the algorithm may proceed to line 815.

At line 811, control circuitry 304 may have determined that there were no database entries matching search entries. In this case, the algorithm may proceed to line 812.

At line 812, control circuitry 304 may execute a subroutine to retrieve program guide data associated with the media asset listed as related to the related search entry using control circuitry. Afterwards, the algorithm may proceed to line 814.

At line 814, control circuitry 304 may execute a subroutine to remove search entry from the list of search entries being retrieved from storage using control circuitry if neither of the conditions at lines 609 or 611 is satisfied.

At line 815, control circuitry 304 may execute a subroutine to generate a preference level for each search entry of the plurality of search entries based on the frequency of occurrence of each search entry of the plurality of search entries using control circuitry. For example, in some embodiments, control circuitry 304 may sort the search entries by occurrence and assign the top portion, such as the top 25%, a "high" preference level, the medium portion, such as the middle 50%, a "medium" preference level and the bottom portion, such as a 25%, a "low" preference level. In other embodiments, control circuitry 304 may assign preference levels based on thresholds. For example, control circuitry 304 may assign any search entries with a frequency of occurrence greater than a threshold, such as 10, a "high" preference level, and any media asset with a frequency of occurrence less than a threshold, such as 4, a "low" preference level. Afterwards, the algorithm may proceed to the termination subroutine at line 817.

At line 817, control circuitry 304 may execute a termination subroutine after the algorithm has performed its function and all instances of search entries have been processed and checked against the database. For example, in some embodiments, control circuitry 304 may destruct variables, perform garbage collection, free memory or clear the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run time and performance metrics without fundamentally changing the inputs or final outputs. For example, in some embodiments, the code may be rewritten so control circuitry 304 is instructed to evaluate multiple instances of search entries and submit multiple database queries simultaneously using a plurality of processors or processor threads. It is also understood that, although we may describe control circuitry 304 interacting with a single database, this is only a single embodiment described for illustrative purposes, and the algorithm of FIG. 8. may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front end efficiently stored on a small local drive to access a larger database stored on a remote server on demand.

In some embodiments, control circuitry 304 may store, in storage circuitry, search behavior of a user, in which the search behavior includes both a plurality of search entries and the frequency of occurrence of each search entry of the plurality of search entries. Control circuitry 304 may retrieve, from the storage circuitry, the search behavior along with program guide data that corresponds to each search entry of the plurality of search entries. Control circuitry 304 may generate a preference level for each search entry of the plurality of search entries based on the frequency of occurrence of each search entry of the plurality of search entries. For example, control circuitry 304 may assign a preference level by sorting the search entries by the frequency of occurrence and calculating the appropriate preference level based on either the ranking of the frequency or a predetermined threshold. For example, in some embodiments, control circuitry 304 may sort the search entries by occurrence and assign the top portion, such as the top 25%, a "high" preference level, the middle portion, such as the portion between the top 25% and the bottom 25%, a "medium" preference level and the bottom portion, such as the bottom 25%, a "low" preference level. In another example, control circuitry 304 may assign any search entries with a frequency of occurrence greater than a threshold, such as 10, a "high" preference level, and any media asset with a frequency of occurrence less than a threshold, such as 4, a "low" preference level.

Control circuitry 304 may match the search behavior with program guide data and the respective preference level for each search entry of the plurality of search entries to generate a search profile for the user. Control circuitry 304 may determine, based on the search profile, a matching score between the search profile and each media asset of a plurality of media assets that the user has scheduled to be recorded. Control circuitry 304 may automatically adjust recording priorities corresponding to each respective media asset of the plurality of media assets that the user has scheduled to be recorded based on the matching score. By adjusting the current priorities according to the matching score, control circuitry 304 alters the scheduled recordings of the recorded media assets to better reflect the current interests of the user as shown through the search behavior. For example, control circuitry 304 may increase a media asset (e.g., The Bourne Ultimatum) with a current recording priority of "if possible" to a recording priority of "can't miss", based on a matching score of "high" that indicates that the expected recording priority was "can't miss".

FIG. 9 shows an illustrative example of media guidance displays that may be presented in accordance with some embodiments of the disclosure. FIG. 9 shows media guidance displays, each of which may be generated for display by user equipment, such as user equipment 402, 404 and/or 406. The media guidance displays may have the functionality of display 312. In some embodiments, control circuitry 304 may store, in storage 308, search behavior of a user, in which the search behavior includes both a plurality of search entries, such as search entry 902, input by the user via user input interface 310, and the frequency that the user input each search entry 902 of the plurality of search entries. For example, control circuitry 304 may detect, via user input interface 310, the user inputting a search entry 902, including at least one of a keyword, program title, or person, related to media assets 904, and may store, in storage 308, the search entry 902 input by the user. For example, the search entry may refer to a specific television series or a favorite actor, director, genre, episode title, broadcast time, broadcast channel, or categories, such as new releases. In another example, control circuitry 304 may store a list of search entries input by the user such as "ER; Matt Damon; Oceans Eleven; News; Friends; Oceans Eleven; George Clooney; Friends; Weather; Yankees; Will and Grace", where an entry can occur more than once.

In some embodiments, control circuitry 304 may keep track of the number of times that the user enters related search entries and may store, in storage 308, alongside the search entry 902 the number of times the user has entered the search entry 902 or a related search entry. In some embodiments, control circuitry 304 may group related search entries together, where related search entries are all keywords, program titles, or names of people related to the specified media assets 904 and so are interchangeable in indicating interest for specified media assets 904. For example, "Matt Damon", "Oceans Eleven" and "George Clooney" are related search entries and may be grouped together to determine frequency of the search entries so that together the group was mentioned 5 times making it the search entry with the highest frequency. In some embodiments, control circuitry 304 may count a search entry 902 multiple times if the keyword used in the search entry 902 is known to be related to multiple media assets 904. For example, control circuitry 304 may consider a search entry 902 as related to multiple television shows if all television shows include the actor who was the target of the search entry 902.

In some embodiments, control circuitry 304 may determine related search entries by grouping together search entries that lead to the user picking a specific media asset of the specified media assets 904 and then associating each of the search entries with the media asset selected when the search entry was used. For example, control circuitry 304 may group together search entries, where a first search entry is the name of a television program, and the second search entry is the name of a cast member in the television program, as both search entries lead to the user selecting the same television program. In some embodiments, control circuitry 304 may determine related search entries by grouping together keywords associated with a specific media asset based upon the program guide data 906 from media guidance data source 418. For example, control circuitry 304 may group together search entries, where a first search entry is the name of a television program, and the second search entry is the name of a cast member in the television program, because the program guide data 906 from media guidance source 418 shows that both search entries are related to the same media asset.

In some embodiments, control circuitry 304 may retrieve, from the storage 308, the search behavior that is saved locally on the storage 308. In some embodiments, control circuitry 304 may retrieve, from the storage at media content source 416 and/or media guidance data source 418, the search behavior via communications network 414. In some embodiments, control circuitry 304 may retrieve, from the storage at media guidance data source 418 that is accessed via communications network 414, program guide data 906 that corresponds to each search entry 902 of the plurality of search entries. For example, control circuitry 304 may retrieve each of the search entries of the list of search entries stored, such as "ER; Matt Damon; Oceans Eleven; News; Friends; Oceans Eleven; George Clooney; Friends; Weather; Yankees; Will and Grace" as well as the program guide data 906, such as program title (e.g., News at 10, The Monuments Men), genre (e.g., Sit-Com, Action Movie), and/or broadcast time (e.g., 7 pm, 8 pm, 10 pm) associated with the television shows or media assets associated with each search entry 902. In some embodiments, control circuitry 304 may determine which media assets 904 the search entries such as search entry 902 are related to and may search the database as described above for the program guide data 906 from media guidance data source 418 for each of the media assets 904 related to a search entry 902. For example, control circuitry 304 may retrieve a search entry 902, which targets a television show, such as a sitcom, and may search the database for any media assets 904 related to the search entry 902. In some embodiments, control circuitry 304 may then, based on the related media assets 904 listed in the database, retrieve program guide data 906 from media guidance data source 418.

In some embodiments, control circuitry 304 may generate a preference level for each search entry of the plurality of search entries input by the user via user input interface 310 based on the frequency that the user input each search entry 902 of the plurality of search entries. In some embodiments, control circuitry 304 may generate preference levels as a set of categories or levels. In some embodiments, when generating a preference level for each search entry 902, control circuitry 304 may rank the plurality of search entries by the frequency of occurrence of each search entry 902 and assign to each respective search entry 902 a corresponding preference level, in which each corresponding preference level reflects a respective ranking. In some embodiments, control circuitry 304 may indicate preference levels through the use of categories describing preference, such as "high", "medium", and "low", based on thresholds for each category, or may indicate preference levels through a numerical system related to the ranking of the search entry 902. For example, control circuitry 304 may sort the list of search entries such as "ER; Matt Damon; Oceans Eleven; News; Friends; Yankees; Oceans Eleven; George Clooney; ER; Weather; Yankees; ER; Friends;" by frequency of occurrence to determine that the search entries ranked in order of frequency of occurrence is "ER; Oceans Eleven; Friends; Yankees; Matt Damon; News; George Clooney; Weather; Will and Grace". Control circuitry may determine that a top portion of the search entries such as "ER" may be a "high" preference level, a middle portion of the search entries such as "Oceans Eleven" and "Friends" may be a medium preference level, and a bottom portion of the search entries such as "News", "Weather", "Yankees" and "Will and Grace" may be a "low preference level". Control circuitry may determine that search entries such as "Matt Damon" and "George Clooney" which are related to the search entry "Oceans Eleven" have the same preference level as "Oceans Eleven" even though each of the search entries does not share the frequency, so that both "Matt Damon" and "George Clooney" have a "medium" preference level.

In some embodiments, control circuitry 304 may match the search behavior with program guide data 906 from media guidance data source 418 and the respective preference level for each search entry 902 of the plurality of search entries input by the user via user input interface 310 to generate a search profile for the user. In some embodiments, control circuitry 304 may analyze the combination of the search behavior, program guide data 906 from media guidance data source 418, and the respective preference level for each search entry 902 of the plurality of search entries input by the user via user input interface 310, to determine trends in the preference level. For example, control circuitry 304 may match the preference levels of the various television shows (e.g., ER with a "high" preference level, Friends with a "medium" preference level, Will and Grace "low" preference level) that the user has searched for with the program guide data to determine trends in the interests of the user, such as determining that the user likes Sit-Coms but prefers Drama television shows and Action Movies.

In some embodiments, control circuitry 304 may determine the elements of media assets that the user prefers by using the ranking of the preference level to determine the most searched for program guide data and may generate the search profile based on the ranking of the elements of program guide data 906 that the user search for most frequently. For example, control circuitry 304 may use the ranking of the preference level to ranking the program guide information 906, such as program title, related people, or broadcast channel, in order to determine preference level for the program guide data 906, such as program title, related people, or broadcast channel.

In some embodiments, control circuitry 304 may break down the program guide data 906 information for a media asset into multiple components and may search for overlapping elements among multiple search entries. For example, control circuitry 304 may rank the program title and related people elements of the program guide data 906 separately and may determine that multiple entries have the same related people. Based on this determination, control circuitry 304 may combine the multiple preference levels associated with the same related people to form a single entry in the search profile representing the preference level of the related people based on the preference level of each of the multiple search entries that were associated with the related people.

In some embodiments, control circuitry 304 may determine, based on the search profile, a matching score between the search profile and each media asset 910 of a plurality of media assets that the user has scheduled to be recorded. In some embodiments, when determining the matching score, control circuitry 304 may retrieve program guide data 906 for each media asset 910 of the plurality of media assets 908 and compare respective program guide data 906 for each media asset 908 of media assets 910 with the program guide data 906 in the search profile to generate an expected preference level for each media asset 910 of the plurality of media assets 908 based on the search profile. For example, control circuitry 304 may determine that "The Bourne Ultimatum" has a "desired" recording priority as set by the user while setting up the recording schedule. Control circuitry 304 may determine that because "The Bourne Ultimatum" is an action movie with Matt Damon and both "action movie" and "Matt Damon" are associated with "medium" preference level, "The Bourne Ultimatum" has a "medium" expected preference level. In another example, control circuitry 304 may determine that the shows "ER" and "Will and Grace" have a "high" and "low" expected preference level respectively because the search profile lists a "high" preference level for the show ER and a "low" preference level for the show "Will and Grace".

In some embodiments, when determining the matching score, control circuitry 304 may retrieve a respective current recording priority 912 of each media asset 910 of the plurality of media assets 908 and determine a respective expected recording priority for each media asset 910 of the plurality of media assets 908 based on the expected preference level for each media asset 910 of the plurality of media assets 908 based on the search profile. In some embodiments, control circuitry 304 may have a predetermined threshold for each recording priority in terms of preference level in order to determine what an expected recording priority is based on expected preference level. In some embodiments, control circuitry 304 may receive, from the user via user input interface 310, a selection of thresholds for each recording priority. For example, control circuitry 304 may determine, based on a threshold, that a media asset (e.g., The Bourne Ultimatum) with a "medium" expected preference level, as determined by the preference level of the broadcast channel and related people, may have a "can't miss" expected recording priority. In another example, control circuitry 304 may determine that because "ER" has a "high" expected preference level, "ER" has an expected recording priority of "can't miss". In yet another example, control circuitry 304 may determine that because "Will and Grace" has a "low" expected preference level, it has an expected recording priority of "if space available".

In some embodiments, control circuitry 304 may determine the matching score by comparing the respective current recording priority 912, which indicates the last known interest of the user in regards to the media asset, and the respective expected recording priority as calculated based on the search profile. In order to determine a matching score which indicates whether there is a match between the last known interest of the user in the media asset 910 and the interest of the user as described in the search profile, control circuitry 304 may compare the current recording priority 912, which indicates the last known interest of the user, and the expected recording priority calculated based on the search profile. For example, control circuitry 304 may determine that the current recording priority of "The Bourne Ultimatum" (e.g., "desired") does not match the expected recording priority (e.g., "can't miss") and determine a matching score indicating that the current recording priority does not match the search profile and needs to be increased. In another example, control circuitry 304 may determine that the current recording priority of "ER" (e.g., "can't miss") matches the expected recording priority (e.g., "can't miss") and determine a matching score which indicates the match. In yet another example, control circuitry 304 may determine that the current recording priority of "Will and Grace" (e.g., "if possible") does not match the expected recording priority (e.g., "if space available") and determine a matching score indicating that the current recording priority does not match the search profile and needs to be decreased.

In some embodiments, control circuitry 304 may represent whether there is a match between the last known interest of the user in the media asset 910 and the interest of the user as described in the search profile by a value which indicates a measure of the difference between the last known interest of the user in the media asset 910 and the interest of the user as described in the search profile. In some embodiments, control circuitry 304 indicates matching score by indicating whether the current recording priority 912 needs to be increased or decreased based on whether it is greater than, less than, or equal to the expected recording priority, and the matching score is represented by one of three values, each representing one of the three possible conditions.

In some embodiments, control circuitry 304 indicates the matching score as a difference between the level of the current recording priority 912 and the level of the expected recording priority and so the matching score has a range based on the available recording priority levels. For example, control circuitry 304 may determine that a movie (e.g., The Bourne Ultimatum) has a higher current recording priority than expected recording priority and may indicate with one of the three possible values that the current recording priority needs to be decreased by a predetermined amount. In another example, control circuitry 304 may determine that a movie (e.g., The Bourne Ultimatum) has a recording priority two levels higher than expected and so may indicate that the current recording priority needs to be decreased by two levels.

In some embodiments, control circuitry 304 shows recording priorities as a set of categories describing the priority such as "can't miss", "if possible", "desired", and "if space available". In some embodiments, control circuitry 304 may have separate instructions for each recording priority regarding how long to keep the recorded media asset, how to handle scheduling conflicts with limited tuner availability, and/or how to handle limited storage capacity for future recordings. For example, a "can't miss" recording priority may indicate that the program must be recorded, in preference to all other programs airing simultaneously, and recordings may be deleted to clear space for the program. In another example, an "if possible" priority may indicate that the program should be recorded if at all possible, unless there are conflicts with can't miss programs airing simultaneously, or unless any can't miss programs that are recorded would have to be deleted. In yet another example, a "desired" priority may indicate that the user would like the program to be recorded, unless there are conflicts with can't miss priority programs or with if possible priority programs, or unless any can't miss priority programs or if possible priority programs that are recorded would have to be deleted. In yet another example, an "if space available" priority may indicate that the program should be recorded if there is space to do so and if it does not conflict with any higher priority programs. In some embodiments, control circuitry 304 may have predetermined instructions for a recording priority. For example, control circuitry 304 may have set instructions loaded for each of the recording priorities. In some embodiments, control circuitry 304 may have custom instructions specified by the user for a recording priority. For example, control circuitry 304, may receive, via user input interface 310, custom instructions for specific recording priorities as part of the process of scheduling a recording.

In some embodiments, control circuitry 304 may include in the instructions for each recording priority instructions for deletion of the media assets associated with that recording priority. For example, control circuitry 304 may delete a television show (e.g., Will and Grace) with a lower recording priority after a specified amount of time or to make space available for additional recordings. In some embodiments, control circuitry 304 may include deletion priorities which indicate instructions for the deletion of a media asset. In some embodiments, deletion priorities may correspond to the recording priorities of the media asset. In some embodiments, control circuitry 304 may adjust the deletion priorities of the media assets according to search behavior as discussed herein.

In some embodiments, control circuitry 304 may increase or decrease the recording priority of a media asset of the plurality of media assets based on the matching score, in which the matching score of the media asset indicates that the expected recording priority of the media asset is higher or lower than the current recording priority 912 of the media asset and the amount of increasing or decreasing the current recording priority 912 of the media asset is a predetermined increment. For example, control circuitry 304 may increase the current recording priority 912 of "The Bourne Ultimatum" a single level, from "desired" to "if possible". In another example, control circuitry 304 may decrease the current recording priority 912 of "Will and Grace" a single level from "if possible" to "desired".

In some embodiments, control circuitry 304 may set the current recording priority 912 of the media asset to match the expected recording priority of the media asset based on the matching score, in which the matching score indicates the difference between the current recording priority 912 of the media asset and the expected recording priority of the media asset. For example, control circuitry 304 may increase the current recording priority 912 of "The Bourne Ultimatum" to match the expected recording priority by increasing the current recording priority 912 from "desired" to "can't miss". In another example, control circuitry 304 may decrease the current recording priority 912 of "Will and Grace" to match the expected recording priority by decreasing the current recording priority 912 from "desired" to "if space available".

In some embodiments, when adjusting the recoding priorities, control circuitry 304 may determine an available storage capacity of a device including storage with respect to a given period and determine an amount of the respective media assets of the plurality of media assets 908 that the user has scheduled to be recorded that corresponds to the available storage capacity. For example, control circuitry 304 may set a maximum number of media assets that can be recorded based on the available storage and select that amount of media assets 908 scheduled to be recorded with the highest recording priority. Control circuitry 304 may then retain, for the given period, a scheduling of each respective media asset of the plurality of media assets that the user has scheduled to be recorded for each respective media asset 910 that has a corresponding recording priority that is equal to or less than the amount and unschedule a remainder of the plurality of media assets for recording for the given period. For example, control circuitry 304 may keep the scheduled recordings of any of the media assets 908 with the highest recording priorities up to the set maximum number and remove any additional media assets from the recording schedule.

In some embodiments, control circuitry 304 may isolate a set of the search behavior that corresponds to data stored within a predetermined period of time relative to a present time and may generate the preference level based only on the set of the search behavior. For example, control circuitry 304 may access search entries input by the user within the last three months and determine the preference levels based only on the search entries within that period.

In some embodiments, control circuitry 304 may notify the user of changes to the scheduled recordings based on the adjusted recording priorities. For example, control circuitry 304 may notify the user through a notification on the screen of the television how the adjusted recording priority of the action movie (e.g., The Bourne Ultimatum) affected the recording schedule.

In some embodiments, control circuitry 304 may receive user input that indicates approval or disapproval of the adjusted recording priorities; and alter the search profile based on the approval or disapproval of the user. For example, control circuitry 304 may receive from the user an indication of disapproval of the change to the schedule, and based on the associated adjusted recording priority, alter the search profile to prevent similar changes in the future.

Figure 10:
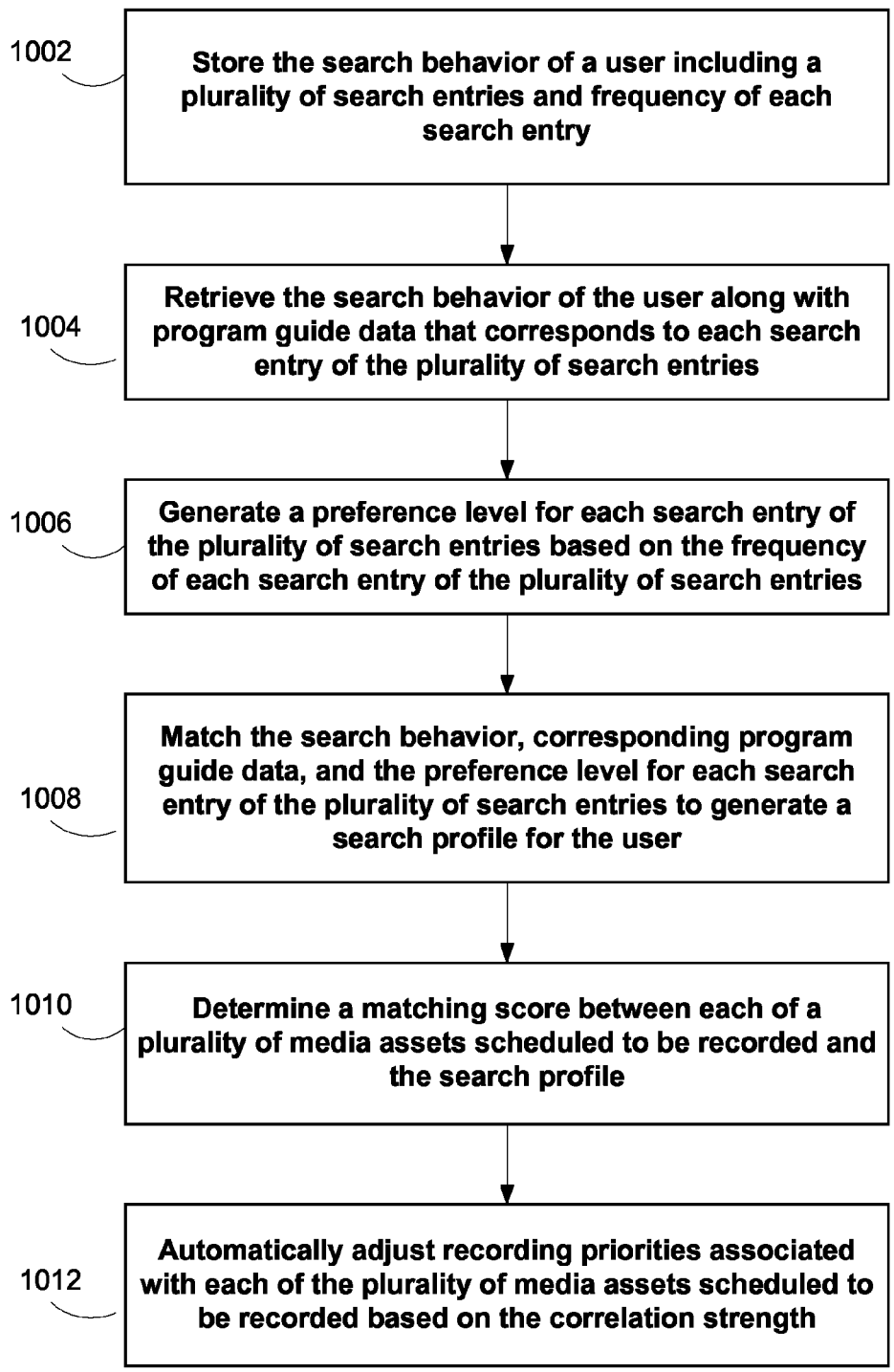
FIG. 10 shows a flowchart of illustrative steps for adjusting the recording priority of media assets, in accordance with some embodiments of the disclosure.

FIG. 10 shows a flowchart of illustrative steps for adjusting the recording priority of media assets, in accordance with some embodiments of the disclosure. It should be noted that process 1000 or any step thereof could be performed on, or provided by, any of the devices shown in FIGS. 3-4. For example, process 1000 may be executed by control circuitry 304 as instructed by a media guidance application implemented on user equipment 402, 404, and/or 406 in order to adjust the priority of media assets scheduled to be recorded. In addition, one or more steps of process 1000 may be incorporated into or combined with one or more steps of any other process or embodiment.

At 1002, control circuitry 304 may store, in storage 308, the search behavior of a user, in which the search behavior includes both a plurality of search entries and the frequency of occurrence of each search entry 902 of the plurality of search entries. For example, control circuitry 304 stores each search entry 902 input by the user when searching for something to watch as well as the frequency that the user inputs the search entry 902. Process 1000 proceeds to 1004.

At 1004, control circuitry 304 may retrieve, from the storage 308, the search behavior along with program guide data 906 that corresponds to each search entry 902 of the plurality of search entries. For example, control circuitry 304 may retrieve the list of media assets 904, such as a set of television series that the user has searched for, as well as the program guide data 906, such as program title, genre, and/or broadcast time, associated with the media assets 904, associated with each search entry 902. Process 1000 proceeds to 1006.

At 1006, control circuitry 304 may generate a preference level for each search entry 902 of the plurality of search entries based on the frequency of occurrence of each search entry 902 of the plurality of search entries. For example, control circuitry 304 may determine that the user has searched for a television show (e.g., ER) more often than the sports games of a favorite team (e.g., the Yankees) and determine that the user has a higher preference for the television show (e.g., ER) than the favorite sports team (e.g., the Yankees). Process 1000 proceeds to 1008.

At 1008, control circuitry 304 may match the search behavior with program guide data 906 and the corresponding preference level for each search entry 902 of the plurality of search entries to generate a search profile for the user. For example, control circuitry 304 may match the preference levels of the resulting media assets 904, such as the various television shows that the user has searched for, with the program guide data 906 to determine trends in the interests of the user, such as determining that the user has a preference for television shows on a specific channel (e.g., NBC). Process 1000 proceeds to 1010.

At 1010, control circuitry 304 may determine, based on the search profile, a matching score between the search profile and each media asset 910 of a plurality of media assets 908 that the user has scheduled to be recorded. For example, control circuitry 304 may determine that, because the current recording priority of an action movie (e.g., The Bourne Ultimatum) does not match the expected recording priority, the action movie (e.g., The Bourne Ultimatum) has a matching score indicating that the current recording priority of the action movie (e.g., The Bourne Ultimatum) needs to be increased a level. Process 1000 proceeds 1012.

At 1012, control circuitry 304 may automatically adjust recording priorities 912 corresponding to each respective media asset of the plurality of media assets 908 that the user has scheduled to be recorded based on the matching score. For example, control circuitry 304 may increase the current recording priority of the action movie (e.g., The Bourne Ultimatum) a single level, from "desired" to "if possible", based on the matching score indicating that the expected recording priority was higher than the current recording priority.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

Figure 11:
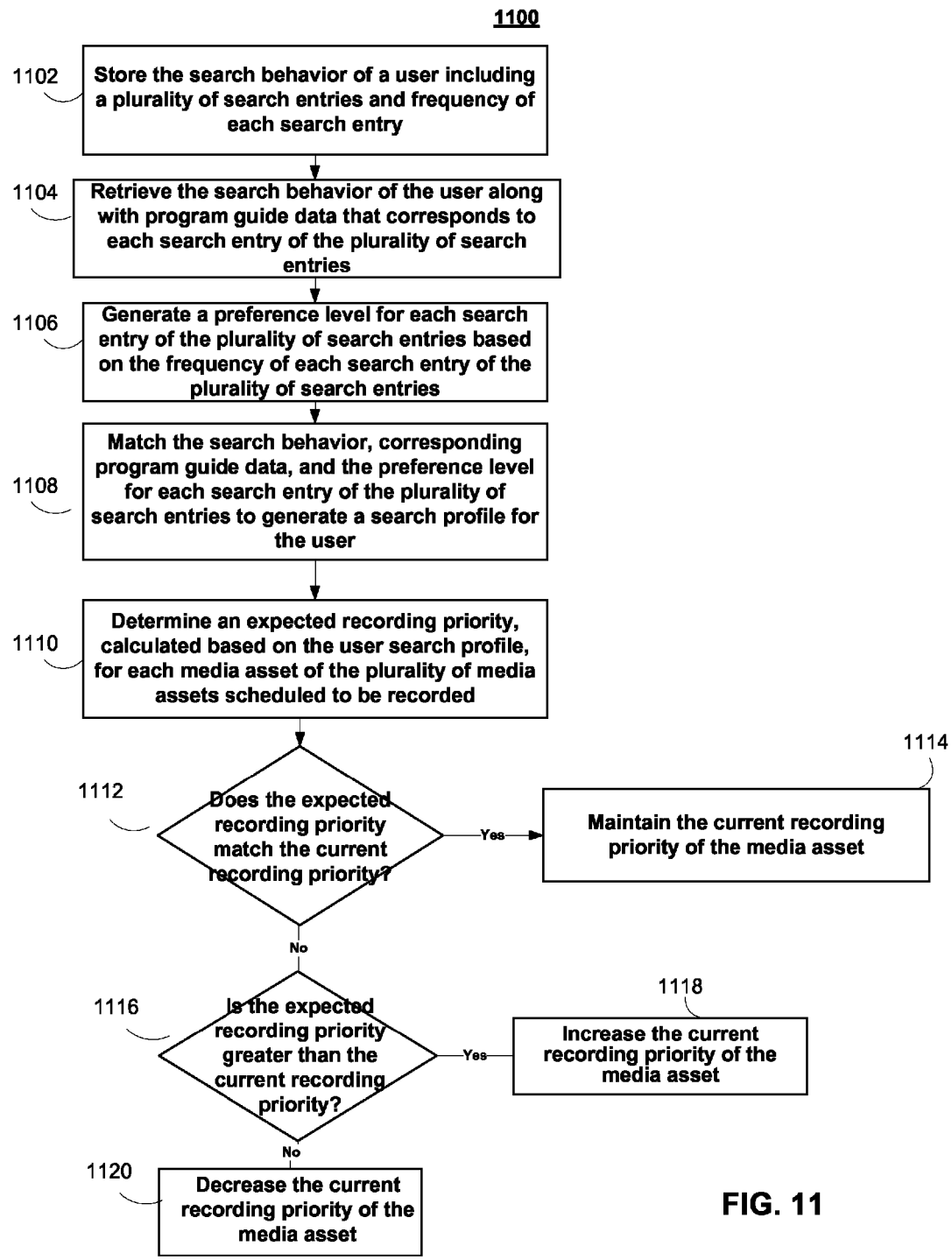
FIG. 11 shows a flowchart of illustrative steps for determining a matching score based on the media assets scheduled to be recorded and the user profile, in accordance with some embodiments of the disclosure.

FIG. 11 shows a flowchart of illustrative steps for adjusting the recording priority of media assets, in accordance with some embodiments of the disclosure. It should be noted that process 1100 or any step thereof could be performed on, or provided by, any of the devices shown in FIGS. 3-4. For example, process 1100 may be executed by control circuitry 304 as instructed by a media guidance application implemented on user equipment 402, 404, and/or 406 in order to adjust the priority of media assets scheduled to be recorded. In addition, one or more steps of process 1000 may be incorporated into or combined with one or more steps of any other process or embodiment.

At 1102, control circuitry 304 may store, in storage 308, the search behavior of a user, in which the search behavior includes both a plurality of search entries and the frequency of occurrence of each search entry 902 of the plurality of search entries. For example, control circuitry 304 stores each search entry 902 input by the user when searching for something to watch as well as the frequency that the user inputs the search entry 102. Process 1100 proceeds to 1104.

At 1104, control circuitry 304 may retrieve, from the storage 308, the search behavior along with program guide data 906 that corresponds to each search entry 902 of the plurality of search entries. For example, control circuitry 304 may retrieve the list of media assets 904, such as a set of television series that the user has searched for, as well as the program guide data 906, such as program title, genre, and/or broadcast time, associated with the media assets 904, associated with each search entry 902. Process 1100 proceeds to 1106.

At 1106, control circuitry 304 may generate a preference level for each search entry 902 of the plurality of search entries based on the frequency of occurrence of each search entry 902 of the plurality of search entries. For example, control circuitry 304 may determine that the user has searched for a television show more (e.g., ER) often than the sports games of a favorite team (e.g., the Yankees) and determine that the user has a higher preference for the television show (e.g., ER) than the favorite sports team (e.g., the Yankees). Process 1100 proceeds to 1108.

At 1108, control circuitry 304 may match the search behavior with program guide data 906 and the corresponding preference level for each search entry 902 of the plurality of search entries to generate a search profile for the user. For example, control circuitry 304 may match the preference levels of the resulting media assets 904, such as the various television shows and movies that the user has searched for (e.g., ER, Will and Grace, Oceans Eleven), with the program guide data 906 to determine trends in the interests of the user, such as determining that the user has a preference for television shows on a specific channel (e.g., NBC) and has a preference for specific actors, such as Matt Damon. Process 1100 proceeds to 1110.

At 1110, control circuitry 304 may determine an expected recording priority, calculated based on the user search profile, for each media asset 910 of the plurality of media assets 908 scheduled to be recorded. For example, based on the genre and cast of the movie, control circuitry 304 may determine that the action movie (e.g., The Bourne Ultimatum) matches with the interests of the user as stated in the search profile and set the expected recording priority to "if possible". Process 1100 proceeds to 1112.

At 1112, control circuitry 304 may determine whether the expected recording priority matches the current recording priority. For example, control circuitry 304 may match the expected "if possible" recording priority of the action movie (e.g., The Bourne Ultimatum) to the current recording priority 912 to determine if the expectation is correct. If yes, process 1100 proceeds to 1114. If no, process 1100 proceeds to 1116.

At 1114, control circuitry 304 may maintain the current recording priority 912 of the media asset 910. For example, if the current recording priority 912 matches the expected recording priority, control circuitry 304 may maintain the current recording priority 912 for the action movie (e.g., The Bourne Ultimatum) scheduled to be recorded.

At 1116, control circuitry 304 may determine whether the expected recording priority is greater than the current recording priority 912. For example, if the current recording priority 912 of the action movie (e.g., The Bourne Ultimatum) does not match the expected recording priority, control circuitry 304 may compare the expected recording priority with the current recording priority 912 to determine if the expected recording priority is greater than the current recording priority. If yes, process 1100 proceeds to 1118. If no, process 1100 proceeds to 1120.

At 1118, control circuitry 304 may increase the current recording priority 912 of the media asset 910. For example, if the current recording priority 912 of the action movie (e.g., The Bourne Ultimatum) was "desired", control circuitry 304 may increase the current recording priority 912 to "if possible".

At 1120, control circuitry 304 may decrease the current recording priority 912 of the media asset 910. For example, if the current recording priority 912 of the action movie (e.g., The Bourne Ultimatum) was "can't miss", control circuitry 304 may decrease the current recording priority 912 to "if possible".

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, recommending a display device for media consumption may be performed by processing circuitry (e.g., by processing circuitry 306 of FIG. 3). The processing circuitry, for instance, may be a general purpose processor, a customized integrated circuit (e.g., an ASIC), or a field programmable gate array (FPGA) within user equipment 300, media content source 416, or media guidance data source 418. For example, the media content preferences as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted; the systems and/or methods described above may be applied to, or used in accordance with, other systems and/or methods.

What is claimed is:

1. A method for adjusting priority of media assets scheduled to be recorded, the method comprising:
receiving search input from a user;
searching a database of search entries, that include search terms previously input by the user, for a search term that corresponds to the search input, wherein the database represents search behavior of the user, wherein the database is stored in storage circuitry;
in response to identifying the search term that was previously input by the user and that corresponds to the search input:
incrementing a counter associated with the identified search term, wherein the counter represents frequency of the identified search term; and
storing the counter in the search entry that includes the identified search term that matches the search input received from the user, wherein each search entry includes at least one search term and a corresponding counter representing frequency of the at least one search term;
retrieving, from the storage circuitry, the search behavior along with program guide data that corresponds to each search entry of the plurality of search entries;
generating a preference level for each search entry of the plurality of search entries based on the frequency of each search entry of the plurality of search entries;
matching the search behavior with program guide data and the respective preference level for each search entry of the plurality of search entries to generate a search profile for the user;
retrieving a list of media assets that the user has previously scheduled to be recorded;
determining, based on the search profile, a matching score between the search profile and each media asset of the retrieved plurality of media assets that the user has scheduled to be recorded; and
based on the matching score, automatically adjusting recording priorities corresponding to each respective media asset of the retrieved list of the plurality of media assets that the user has previously scheduled to be recorded.

2. The method of claim 1, wherein each search entry of the plurality of search entries comprises at least one of: keywords, program titles, or related people.

3. The method of claim 1, wherein retrieving, from the storage circuitry, the search behavior further comprises isolating a set of the search behavior that corresponds to data stored within a predetermined period of time relative to a present time, and wherein generating the preference level comprises generating the preference level based only on the set of the search behavior.

4. The method of claim 1, wherein automatically adjusting the recording priorities corresponding to each media asset of the plurality of media assets that the user has scheduled to be recorded based on the matching score further comprises:
determining an available storage capacity of a device comprising storage with respect to a given period;
determining an amount of the respective media assets of the plurality of media assets that the user has scheduled to be recorded that corresponds to the available storage capacity;
retaining, for the given period, a scheduling of each respective media asset of the plurality of media assets that the user has scheduled to be recorded for each respective media asset that has a corresponding recording priority that is equal to or less than the amount; and
unscheduling a remainder of the plurality of media assets for recording for the given period.

5. The method of claim 1, wherein the generating of the preference level comprises:
ranking the plurality of search entries by the frequency of each respective entry of the plurality of search entries; and
assigning to each respective entry of the plurality of search entries a respective preference level, wherein each respective preference level reflects a respective ranking.

6. The method of claim 1, wherein the determining the matching score comprises:
retrieving program guide data for each media asset of the plurality of media assets;
comparing respective program guide data for each respective media asset of the plurality of media assets with the program guide data in the search profile to generate an expected preference level for each media asset of the plurality of media assets based on the search profile;

retrieving a respective current recording priority of each media asset of the plurality of media assets;

determining a respective expected recording priority for each media asset of the plurality of media assets based on the expected preference level for each media asset of the plurality of media assets based on the search profile; and determining the matching score based on how close the expected recording priority matches the current recording priority.

7. The method of claim 6, wherein the automatically adjusting of the recording priority comprises increasing or decreasing the recording priority of a media asset of the plurality of media assets based on the matching score, wherein the matching score of the media asset indicates that the expected recording priority of the media asset is higher or lower than the current recording priority of the media asset, and wherein the amount of increasing or decreasing the current recording priority of the media asset is a predetermined increment.

8. The method of claim 6, wherein the automatically adjusting of the recording priority comprises setting the current recording priority of the media asset to match the expected recording priority of the media asset based on the matching score, wherein the matching score indicates the difference between the current recording priority of the media asset and the expected recording priority of the media asset.

9. The method of claim 1, further comprising notifying the user of changes to the scheduled recordings based on the adjusted recording priorities.

10. The method of claim 1, further comprising:
receiving user input that indicates approval or disapproval of the adjusted recording priorities; and
altering the search profile based on the approval or disapproval of the user.

11. A system for adjusting priority of media assets scheduled to be recorded, the system comprising:
storage circuitry configured to store a database of search entries that include search terms previously input by the user, wherein the database represents search behavior of the user; and
control circuitry configured to:
receive search input from a user;
search a database of search entries, that include search terms previously input by the user, for a search term that corresponds to the search input, wherein the database represents search behavior of the user, wherein the database is stored in storage circuitry;
in response to identifying the search term that was previously input by the user and that corresponds to the search input:
increment a counter associated with the identified search term, wherein the counter represents frequency of the identified search term; and
storing the counter in the search entry that includes the identified search term that matches the search input received from the user, wherein each search entry includes at least one search term and a corresponding counter representing the at least one search term;
retrieve, from the storage circuitry, the search behavior along with program guide data that corresponds to each search entry of the plurality of search entries;
generate a preference level for each search entry of the plurality of search entries based on the frequency of each search entry of the plurality of search entries;
match the search behavior with program guide data and the respective preference level for each search entry of the plurality of search entries to generate a search profile for the user;
retrieve a list of media assets that the user has previously scheduled to be recorded;
determine, based on the search profile, a matching score between the search profile and each media asset of the retrieved plurality of media assets that the user has scheduled to be recorded; and
based on the matching score, automatically adjust recording priorities corresponding to each respective media asset of the retrieved list of the plurality of media assets that the user has previously scheduled to be recorded.

12. The system of claim 11, wherein each search entry of the plurality of search entries comprises at least one of: keywords, program titles, or related people.

13. The system of claim 11, wherein the control circuitry configured to retrieve, from the storage circuitry, the search behavior further is further configured to isolate a set of the search behavior that corresponds to data stored within a predetermined period of time relative to a present time, and wherein the control circuitry configured to generate the preference level is further configured to generate the preference level based only on the set of the search behavior.

14. The system of claim 11, wherein control circuitry configured to automatically adjust the recording priorities corresponding to each media asset of the plurality of media assets that the user has scheduled to be recorded based on the matching score further is further configured to:
determine an available storage capacity of a device comprising storage with respect to a given period;
determine an amount of the respective media assets of the plurality of media assets that the user has scheduled to be recorded that corresponds to the available storage capacity;
retain, for the given period, a scheduling of each respective media asset of the plurality of media assets that the user has scheduled to be recorded for each respective media asset that has a corresponding recording priority that is equal to or less than the amount; and
unschedule a remainder of the plurality of media assets for recording for the given period.

15. The system of claim 11, wherein the control circuitry configured to generate the preference level is further configured to:
rank the plurality of search entries by the frequency of each respective entry of the plurality of search entries; and
assign to each respective entry of the plurality of search entries a respective preference level, wherein each respective preference level reflects a respective ranking.

16. The system of claim 11, wherein the control circuitry configured to determine the matching score is further configured to:
retrieve program guide data for each media asset of the plurality of media assets;
compare respective program guide data for each respective media asset of the plurality of media assets with the program guide data in the search profile to generate an expected preference level for each media asset of the plurality of media assets based on the search profile;

retrieve a respective current recording priority of each media asset of the plurality of media assets;

determine a respective expected recording priority for each media asset of the plurality of media assets based on the expected preference level for each media asset of the plurality of media assets based on the search profile; and determine the matching score based on how close the expected recording priority matches the current recording priority.

17. The system of claim 16, wherein the control circuitry configured to automatically adjust the recording priority is further configured to increase or decrease the recording priority of a media asset of the plurality of media assets based on the matching score, wherein the matching score of the media asset indicates that the expected recording priority of the media asset is higher or lower than the current recording priority of the media asset, and wherein the amount of increasing or decreasing the current recording priority of the media asset is a predetermined increment.

18. The system of claim 16, wherein the control circuitry configured to automatically adjust the recording priority comprises setting the current recording priority of the media asset to match the expected recording priority of the media asset based on the matching score, wherein the matching score indicates the difference between the current recording priority of the media asset and the expected recording priority of the media asset.

19. The system of claim 11, wherein the control circuitry is further configured to notify the user of changes to the scheduled recordings based on the adjusted recording priorities.

20. The system of claim 11, wherein the control circuitry is further configured to:

receiving user input that indicates approval or disapproval of the adjusted recording priorities; and altering the search profile based on the approval or disapproval of the user.

* * * * *